(12) United States Patent
Andersson et al.

(10) Patent No.: US 10,873,500 B2
(45) Date of Patent: Dec. 22, 2020

(54) COMPUTING DEVICE AND METHOD FOR GENERATING A LINK IPV6 ADDRESS

(71) Applicant: Kaloom Inc., Montreal (CA)

(72) Inventors: Per Andersson, Montreal (CA); Benoit Tremblay, Laval (CA); Suresh Krishnan, Suwanee, GA (US); Laurent Marchand, Montreal (CA)

(73) Assignee: Kaloom Inc., Montreal (CA)

( * ) Notice: Subject to any disclaimer, the term of this patent is extended or adjusted under 35 U.S.C. 154(b) by 281 days.

(21) Appl. No.: 16/143,568

(22) Filed: Sep. 27, 2018

(65) Prior Publication Data
US 2019/0280922 A1 Sep. 12, 2019

Related U.S. Application Data

(60) Provisional application No. 62/639,044, filed on Mar. 6, 2018.

(51) Int. Cl.
*G06F 15/177* (2006.01)
*H04L 12/24* (2006.01)
*H04L 29/12* (2006.01)

(52) U.S. Cl.
CPC ...... *H04L 41/0806* (2013.01); *H04L 61/2007* (2013.01); *H04L 61/6022* (2013.01); *H04L 61/6059* (2013.01)

(58) Field of Classification Search
None
See application file for complete search history.

(56) References Cited

U.S. PATENT DOCUMENTS

| 2004/0151202 | A1 | 8/2004 | Mandavilli et al. |
| 2012/0036179 | A1* | 2/2012 | Hegde ............ H04L 61/1511 709/203 |

(Continued)

FOREIGN PATENT DOCUMENTS

| CN | 100539501 C | 9/2009 |
| CN | 102438050 A | 5/2012 |
| CN | 105872063 A | 8/2016 |

OTHER PUBLICATIONS

PortLand: A Scalable Fault-Tolerant Layer 2 Data Center Network Fabric; Department of Computer Science and Engineering University of California San Diego Authors: Radhika Niranjan Mysore, et al.

(Continued)

*Primary Examiner* — Brian Whipple
*Assistant Examiner* — Anthony T Rotolo
(74) *Attorney, Agent, or Firm* — IP Delta Plus Inc.

(57) ABSTRACT

Computing device (located in a fabric of a data center) and method for generating a link IPv6 address. The computing device determines a local node identifier and a local link identifier for a communication interface of the computing device. The computing device receives from a remote computing device a remote node identifier and a remote link identifier for a remote communication interface of the remote computing device. Based on a comparison of the local and remote node identifiers, the link IPv6 address is generated by using an IPv6 base prefix, the local node identifier, the remote node identifier, the local link identifier, the remote link identifier, and an indicator that the local node identifier is greater or lower than the remote node identifier. A network configuration of the computing device is performed by generating a fabric-wide IPv6 address and one or more link IPv6 address.

24 Claims, 14 Drawing Sheets

(56) References Cited

U.S. PATENT DOCUMENTS

| | | |
|---|---|---|
| 2013/0091269 A1 | 4/2013 | Zhang et al. |
| 2014/0092779 A1 | 4/2014 | Seok et al. |
| 2014/0108624 A1 | 4/2014 | Grundemann et al. |
| 2014/0376405 A1* | 12/2014 | Erickson ............... H04L 9/0861 370/254 |
| 2015/0016407 A1 | 1/2015 | Erickson et al. |
| 2016/0315859 A1 | 10/2016 | Buesker et al. |
| 2018/0262446 A1 | 9/2018 | Zuo |
| 2019/0052538 A1 | 2/2019 | Shih et al. |

OTHER PUBLICATIONS

A Scalable, Commodity Data Center Network Architecture; Department of Computer Science and Engineering University of California, San Diego Authors: Mohammad Al-Fares et al.
VL2: A Scalable and Flexible Data Center Network; Microsoft Research Authors: Albert Greenberg et al.

* cited by examiner

COMPUTING DEVICE AND METHOD FOR GENERATING A LINK IPV6 ADDRESS

TECHNICAL FIELD

The present disclosure relates to the field of data centers. More specifically, the present disclosure relates to a computing device and method for performing a network configuration of the computing device (located in a fabric of a data center) including the generation of a link IPv6 address.

BACKGROUND

Recent years have seen an increasing development of technologies such as Software as a Service (SaaS), cloud computing, etc. This development is fueled by a growing customer demand for products and services based on these types of technologies. This development is also fueled by constant progresses in underlying technologies, such as processing power increase for microprocessors, storage capacity increase for storage devices, and transmission capacity improvements for networking equipment. Furthermore, the average cost of these underlying technologies is falling. However, the decrease in the average cost of the underlying technologies is balanced by the increased customer demand, which requires to constantly update and upgrade the infrastructures used for providing SaaS or cloud computing.

The infrastructure used for providing SaaS or cloud computing is a data center, which combines a very large number of computing servers. Each server has a plurality of multi-core processors, and the combination of the computing servers provides a very high processing capacity, which is used by customers of the data center. Some or all of the servers may also have important storage capacities, so that the combination of the servers also provides a very high storage capacity to the customers of the data center. The data center also relies on a networking infrastructure, for interconnecting the servers and providing access to their computing and/or storage capacity to the customers of the data center. In order to provide a reliable service, very strong requirements in terms of scalability, manageability, fault-tolerance, etc., are imposed on the computing and networking infrastructure of the data center.

With respect to the networking infrastructure of the data center, it is well known that providing efficient and reliable networking services to a very large number of hosts is a complex task. Solutions and technologies have been developed in other contexts, such as networking technologies for providing mobile data services to a very large number of mobile devices. Some of these technologies have been standardized in dedicated instances, such as the Internet Engineering Task Force (IETF®) or the 3rd Generation Partnership Project (3GPP™). However, at least some of the technological challenges of deploying an efficient and reliable networking infrastructure in a data center are specific to the data center context; and need to be addressed with original solutions and technologies.

One substantial challenge with respect to a networking infrastructure involving a large number (e.g. tens of thousands) of devices is the configuration of the networking infrastructure. In particular, the configuration needs to be flexible (to facilitate changes to an initial configuration) and resilient (to avoid that a localized configuration error affects operations of the whole data center). One way to ensure that the network configuration is flexible and reliable is to limit as much as possible human intervention in the configuration process.

Therefore, there is a need for a computing device and method for generating a link IPv6 address for the computing device located in a fabric of a data center. There is also a need for a method performing a network configuration of the computing device including the generation of a fabric-wide IPv6 address and the generation of one or more link IPv6 address.

SUMMARY

According to a first aspect, the present disclosure relates to a computing device. The computing device comprises a communication interface, memory and a processing unit. The memory stores a configuration file. The configuration file comprises an Internet Protocol version 6 (IPv6) base prefix. The processing unit determines a local node identifier and a local link identifier for the communication interface. The processing unit receives from a remote computing device via the communication interface a remote node identifier and a remote link identifier for a remote communication interface of the remote computing device. The processing unit compares the local node identifier and the remote node identifier; and generates an IPv6 address. If the local node identifier is greater than the remote node identifier, the IPv6 address is generated by combining the IPv6 base prefix stored in the configuration file, the local node identifier, the remote node identifier, the local link identifier and an indicator that the local node identifier is greater than the remote node identifier. If the local node identifier is lower than the remote node identifier, the IPv6 address is generated by combining the IPv6 base prefix stored in the configuration file, the remote node identifier, the local node identifier, the remote link identifier and an indicator that the local node identifier is lower than the remote node identifier. The processing unit configures the communication interface with the IPv6 address.

According to a second aspect, the present disclosure relates to a method for generating a link IPv6 address for a computing device located in a fabric of a data center. The method comprises storing a configuration file in a memory of the computing device. The configuration file comprises an IPv6 base prefix. The method comprises determining by a processing unit of the computing device a local node identifier and a local link identifier for a communication interface of the computing device. The method comprises receiving by the processing unit from a remote computing device via the communication interface a remote node identifier and a remote link identifier for a remote communication interface of the remote computing device. The method comprises comparing by the processing unit the local node identifier and the remote node identifier; and generating by the processing unit an IPv6 address. If the local node identifier is greater than the remote node identifier, the IPv6 address is generated by combining the IPv6 base prefix stored in the configuration file, the local node identifier, the remote node identifier, the local link identifier and an indicator that the local node identifier is greater than the remote node identifier. If the local node identifier is lower than the remote node identifier, the IPv6 address is generated by combining the IPv6 base prefix stored in the configuration file, the remote node identifier, the local node identifier, the remote link identifier and an indicator that the local node identifier is lower than the remote node identifier. The method comprises configuring the communication interface with the IPv6 address.

According to a third aspect, the present disclosure provides a non-transitory computer program product comprising instructions executable by a processing unit of a computing device. The execution of the instructions by the processing unit provides for generating a link IPv6 address for a computing device located in a fabric of a data center. More specifically, the execution of the instructions provides for storing a configuration file in a memory of the computing device. The configuration file comprises an IPv6 base prefix. The execution of the instructions provides for determining by the processing unit a local node and a local link identifier for a communication interface of the computing device. The execution of the instructions provides for receiving by the processing unit from a remote computing device via the communication interface a remote node identifier and a remote link identifier for a remote communication interface of the remote computing device. The execution of the instructions provides for comparing by the processing unit the local node identifier and the remote node identifier; and generating by the processing unit an IPv6 address. If the local node identifier is greater than the remote node identifier, the IPv6 address is generated by combining the IPv6 base prefix stored in the configuration file, the local node identifier, the remote node identifier, the local link identifier and an indicator that the local node identifier is greater than the remote node identifier. If the local node identifier is lower than the remote node identifier, the IPv6 address is generated by combining the IPv6 base prefix stored in the configuration file, the remote node identifier, the local node identifier, the remote link identifier and an indicator that the local node identifier is lower than the remote node identifier. The execution of the instructions provides for configuring the communication interface with the IPv6 address.

According to a fourth aspect, the present disclosure relates to a method for performing a network configuration of a computing device located in a fabric of a data center. The method comprises storing a configuration file in a memory of the computing device. The configuration file comprises a first Internet Protocol version 6 (IPv6) base prefix, a fabric identifier, and a second IPv6 base prefix. The method comprises determining by a processing unit of the computing device a host identifier. The method comprises generating by the processing unit a factory-wide IPv6 prefix, by combining the first IPv6 base prefix stored in the configuration file and the fabric identifier stored in the configuration file. The method comprises generating by the processing unit a fabric-wide IPv6 address, by combining the fabric-wide IPv6 prefix and the host identifier. The method comprises determining by the processing unit a local node identifier and a local link identifier for a communication interface of the computing device. The method comprises receiving by the processing unit from a remote computing device via the communication interface a remote node identifier and a remote link identifier for a remote communication interface of the remote computing device. The method comprises comparing by the processing unit the local node identifier and the remote node identifier; and generating by the processing unit a link IPv6 address. If the local node identifier is greater than the remote node identifier, the link IPv6 address is generated by combining the second IPv6 base prefix stored in the configuration file, the local node identifier, the remote node identifier, the local link identifier and an indicator that the local node identifier is greater than the remote node identifier. If the local node identifier is lower than the remote node identifier, the link IPv6 address is generated by combining the second IPv6 base prefix stored in the configuration file, the remote node identifier, the local node identifier, the remote link identifier and an indicator that the local node identifier is lower than the remote node identifier. The method comprises configuring the communication interface with the link IPv6 address.

According to a fifth aspect, the present disclosure relates to a computing device. The computing device comprises a communication interface, memory and a processing unit. The memory stores a configuration file. The configuration file comprises an Internet Protocol version 6 (IPv6) base prefix. The processing unit determines a local node identifier and a local link identifier for the communication interface. The processing unit receives from a remote computing device via the communication interface a remote node identifier and a remote link identifier for a remote communication interface of the remote computing device. The processing unit compares the local node identifier and the remote node identifier; and generates an IPv6 address. If the local node identifier is lower than the remote node identifier, the IPv6 address is generated by combining the IPv6 base prefix stored in the configuration file, the local node identifier, the remote node identifier, the local link identifier and an indicator that the local node identifier is greater than the remote node identifier. If the local node identifier is greater than the remote node identifier, the IPv6 address is generated by combining the IPv6 base prefix stored in the configuration file, the remote node identifier, the local node identifier, the remote link identifier and an indicator that the local node identifier is lower than the remote node identifier. The processing unit configures the communication interface with the IPv6 address.

BRIEF DESCRIPTION OF THE DRAWINGS

Embodiments of the disclosure will be described by way of example only with reference to the accompanying drawings, in which.

DETAILED DESCRIPTION

The foregoing and other features will become more apparent upon reading of the following non-restrictive description of illustrative embodiments thereof, given by way of example only with reference to the accompanying drawings.

Various aspects of the present disclosure generally address one or more of the problems related to the generation of a link IPv6 address for a computing device located in a fabric of a data center; where the generation of the link IPv6 address is automated and resilient to human errors. The present disclosure also addresses a network configuration of the computing device including the generation of a fabric-wide IPv6 address and the generation of one or more link IPv6 address.

Network Architecture of a Data Center

Referring now concurrently to FIGS. 1-4, the network architecture of a data center is illustrated. The network architecture represented in the figures is for illustration purposes, and a person skilled in the art of designing data center architectures would readily understand that other design choices could be made. The teachings of the present disclosure are not limited to the topology of the network architecture represented in the figures; but could also be applied to a network architecture with different design choices in terms of topology.

Figure 1:
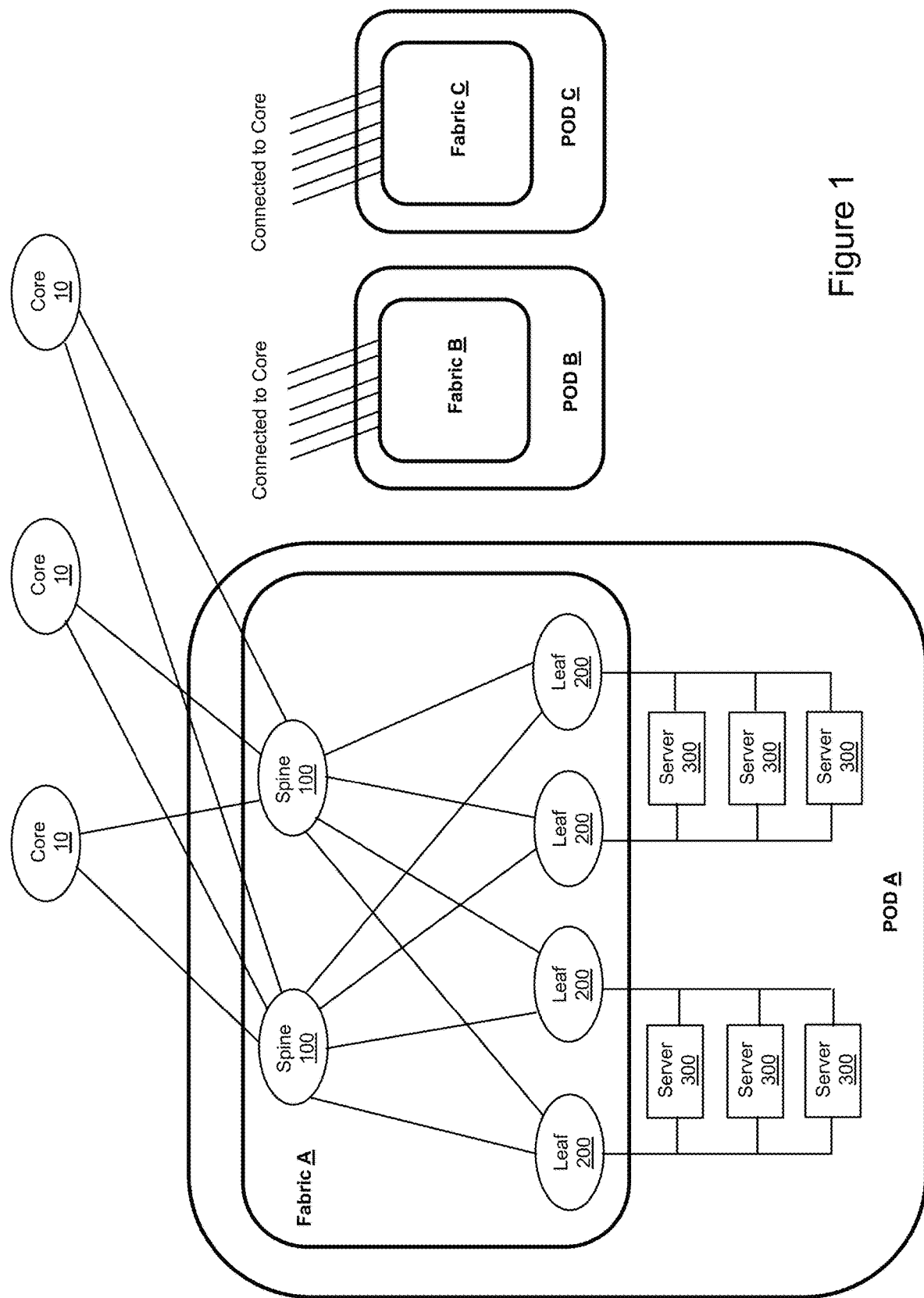
FIG. 1 represents a network architecture of a data center comprising a plurality of pods and fabrics.

Reference is now made more particularly to FIG. 1. The data center is organized into a plurality of pods. Each pod consists of an atomic unit of computing, storage, networking and power. Each pod is designed as a unit, deployed as a unit, automated as a unit, and retired as a unit. Several types of pods may be available, which differ by their design. Zero, one or more instances of each type of pod is deployed in the data center. For illustration purposes, three pods (A, B and C) have been represented in FIG. 1. However, the number of pods in the data center varies from one to tens or even hundreds of pods. The capacity in terms of computing, storage, networking and power of the data center is scaled, by adding (or removing) pods.

Pod A comprises a plurality of servers 300 providing the processing and storage power. The servers 300 are physically organized in one or more racks, depending on the number of servers 300 and the capacity of each rack. Pod A also comprises two hierarchical levels of networking power referred to as fabric A. Fabric A comprises a lower hierarchical level consisting of leaf networking equipment 200, and an upper hierarchical level consisting of spine networking equipment 100. The networking equipment (e.g. spine 100 and leaf 200) of fabric A are physically integrated to the one or more racks comprising the servers 300, or alternatively are physically organized in one or more independent racks.

The leaf networking equipment 200 and the spine networking equipment 100 generally consist of switches, with a high density of communication ports. Therefore, in the rest of the description, the leaf networking equipment 200 and the spine networking equipment 100 will be respectively referred to as leaf switches 200 and spine switches 100. However, other types of networking equipment may be used. For example, in an alternative implementation, at least some of the spine networking equipment 100 consist of routers.

Each leaf switch 200 is connected to at least one spine switch 100, and a plurality of servers 300. The number of servers 300 connected to a given leaf switch 200 depends on the number of communication ports of the leaf switch 200.

In the implementation represented in FIG. 1, each server 300 is redundantly connected to two different leaf switches 200. A server 300 of a given pod (e.g. pod A) is only connected to leaf switches 200 of the fabric (e.g. fabric A) belonging to the given pod (e.g. pod A). A server 300 of a given pod (e.g. pod A) is not connected to leaf switches 200 of a fabric (e.g. fabric B) belonging to another pod (e.g. pod B). Each leaf switch 200 of a given fabric (e.g. fabric A) is connected to all the spine switches 100 of the given fabric (e.g. fabric A). A leaf switch 200 of a given fabric (e.g. fabric A) is not connected to a spine switch 100 of another fabric (e.g. fabric B). In an alternative implementation not represented in the Figures, at least some of the servers 300 are connected to a single leaf switch 200.

Each spine switch 100 is connected to at least one core networking equipment 10, and a plurality of leaf switches 200. The number of leaf switches 200 connected to a given spine switch 100 depends on design choices and on the number of communication ports of the spine switch 100. The core networking equipment 10 provide interworking between the fabrics deployed in the data center, connection to management functionalities of the data center, connection to external networks such as the Internet, etc. Furthermore, although not represented in the Figures for simplification purposes, at least some of the core networking equipment 10 may be connect to a pair of leaf switches 200.

The core networking equipment 10 generally consist of routers. Therefore, in the rest of the description, the core networking equipment 10 will be referred to as core routers 10. However, other types of networking equipment may be used. For example, in an alternative implementation, at least some of the core networking equipment 10 consist of switches.

In the implementation represented in FIG. 1, each spine switch 100 of a given fabric (e.g. fabric A) is connected to all the core routers 10, and is connected to all the leaf switches 200 of the given fabric (e.g. fabric A).

For simplification purposes, fabric A represented in FIG. 1 only comprises two spine switches 100 and four leaf switches 200, while pod A only comprises two groups of three servers 300 respectively connected to leaf switches 200 of the fabric A. However, the number of spine switches 100 and leaf switches 200 of a fabric may vary, based on design choices and networking capabilities (e.g. communication port density) of the spine and leaf switches. Similarly, the total number of servers 300 of a pod may vary, based on design choices, based on the number of leaf switches 200 of the corresponding fabric, and based on networking capabilities (e.g. communication port density) of the leaf switches.

The details of pod B and its corresponding fabric B, as well as pod C and its corresponding fabric C, are not represented in FIG. 1 for simplification purposes. However, pod B/fabric B and pod C/fabric C include a hierarchy of spine switches 100, leaf switches 200 and servers 300 similar to the hierarchy illustrated for pod A/fabric A.

Figure 2:
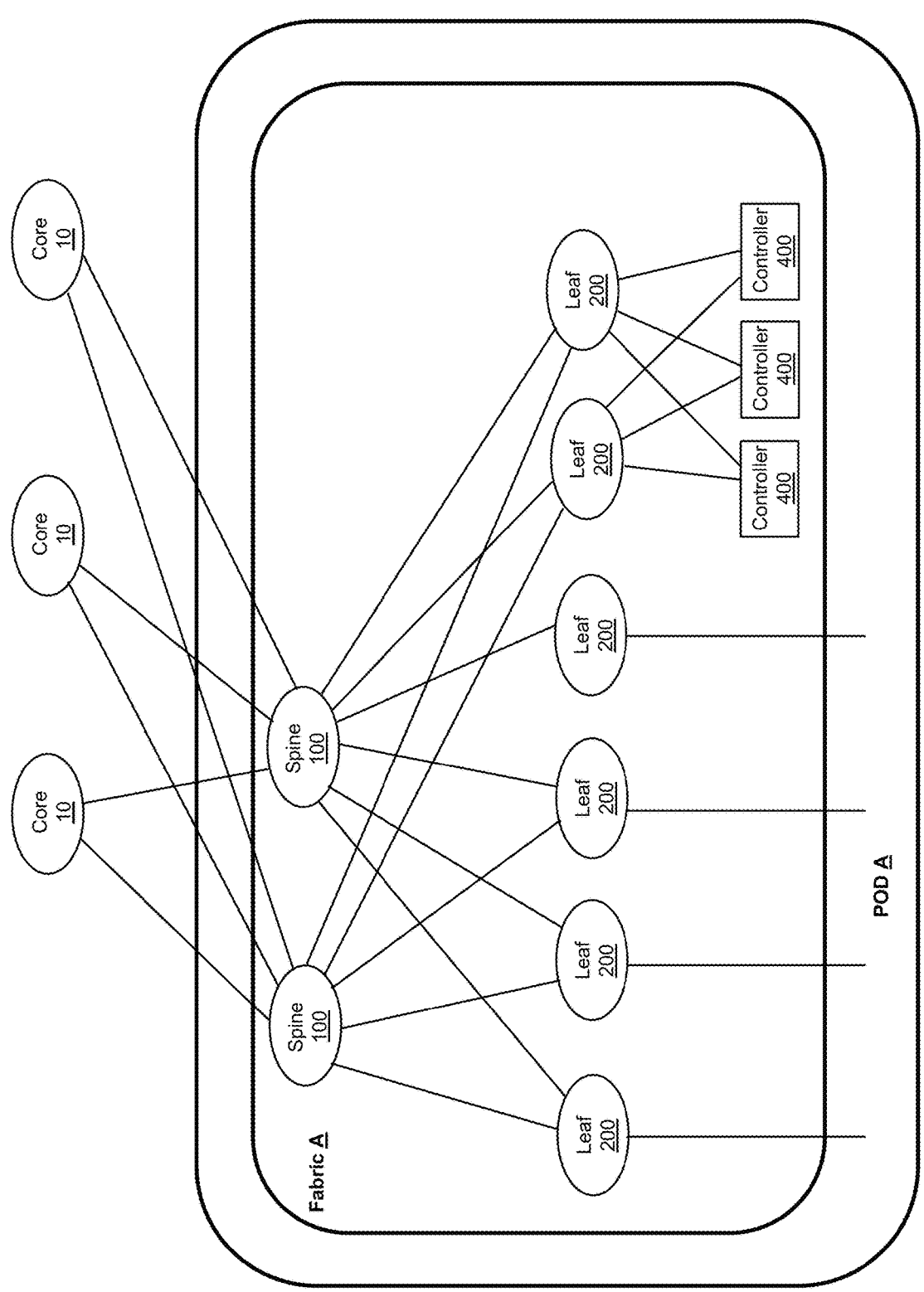
FIG. 2 represents a more detailed view of the fabrics represented in FIG. 1.

Reference is now made more particularly to FIGS. 1 and 2, where FIG. 2 represents an implementation of the data center of FIG. 1, where each fabric further includes one or more controllers 400. The servers 300 have not been represented in FIG. 2 for simplification purposes only.

The controllers 400 of a fabric are responsible for controlling operations of at least some of the nodes (e.g. leaf switches 200 and/or spine switches 100) included in the fabric. Each controller 400 is connected to at least one leaf switch 200. The number of controllers 400 deployed in a given fabric depends on design choices, on the required cumulative processing power of the controllers 400 deployed in the fabric, on the total number of leaf and spine switches deployed in the fabric, etc.

In the implementation represented in FIG. 2, each controller 400 is redundantly connected to two different leaf switches 200. For example, each controller 400 has a first operational connection to a first leaf switch 200, and a second backup connection to a second leaf switch 200. A controller 400 of a given fabric (e.g. fabric A) is only connected to leaf switches 200 of the fabric (e.g. fabric A). A controller 400 of a given fabric (e.g. fabric A) is not connected to leaf switches 200 of another fabric (e.g. fabric B or C). Some leaf switches 200 are dedicated to being connected to controllers 400 (as illustrated in FIG. 2), while other leaf switches 200 are dedicated to being connected to servers 300 (as illustrated in FIG. 1). In an alternative implementation, a leaf switch 200 is concurrently connected to servers 300 and controllers 400.

In another implementation, the controllers 400 are not directly physically connected to the leaf switches 200; but are functionally connected via at least one intermediate equipment such as an intermediate switch (not represented in FIG. 2) between the controllers 400 and the leaf switches 200.

Figure 3:
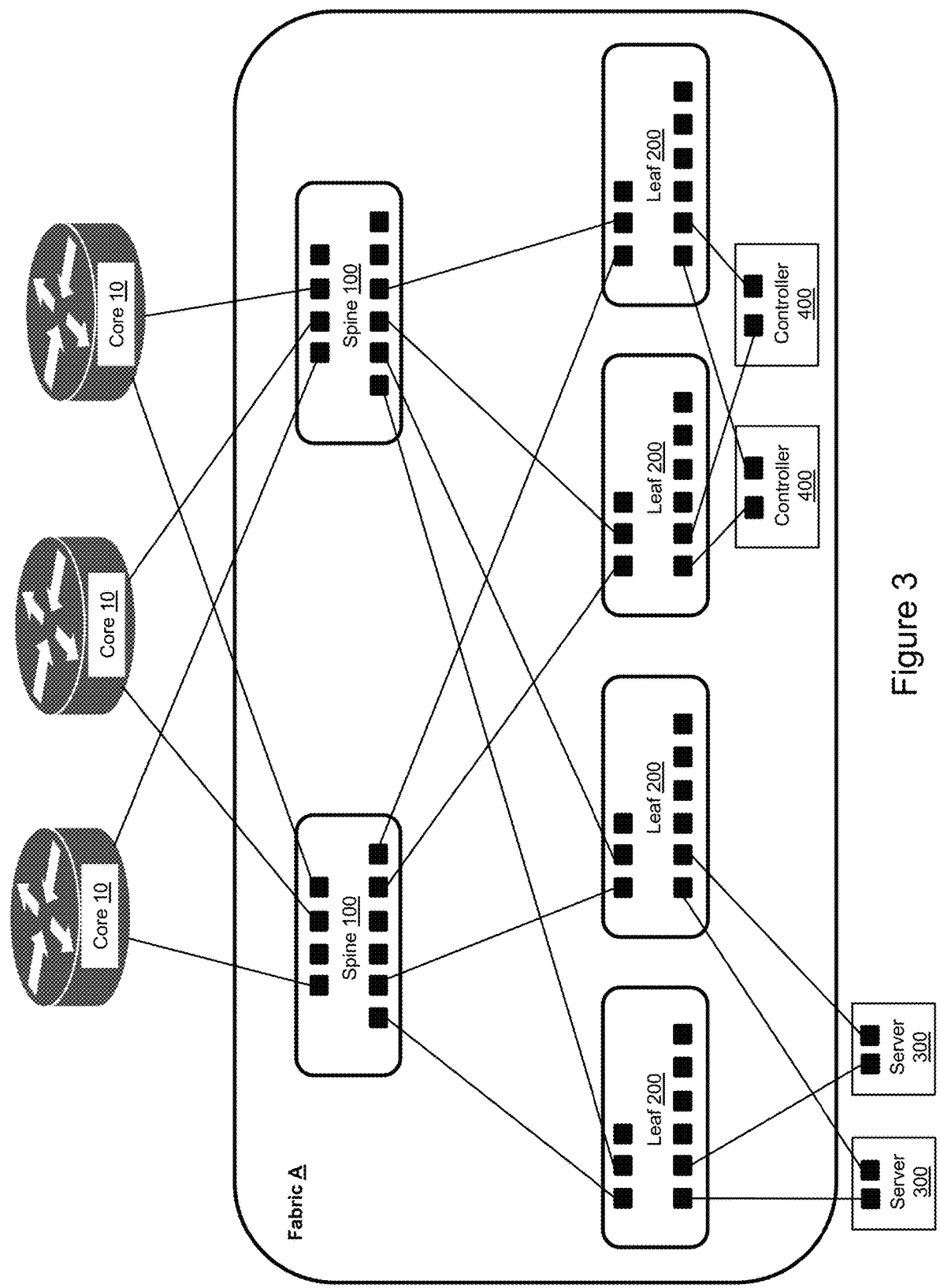
FIG. 3 represents communication ports of the equipment deployed in the pods and fabrics of FIGS. 1-2.

Reference is now made more particularly to FIGS. 1, 2 and 3, where FIG. 3 represents communication ports of the equipment deployed in a fabric/pod.

The spine switches 100 have a dedicated number of uplink communication ports (e.g. 4 represented in FIG. 3) dedicated to the interconnection with the core routers 10, and a dedicated number of downlink communication ports (e.g. 6 represented in FIG. 3) dedicated to the interconnection with the leaf switches 200. The uplink and downlink ports have the same or different networking capabilities. For example, all the ports have a capacity of 10 Gigabytes (Gbps).

The leaf switches 200 have a dedicated number of uplink communication ports (e.g. 3 represented in FIG. 3) dedicated to the interconnection with the spine switches 100, and a dedicated number of downlink communication ports (e.g. 6 represented in FIG. 3) dedicated to the interconnection with the servers 300 or controllers 400. The uplink and downlink ports have the same or different networking capabilities. For example, all the uplink ports have a capacity of 100 Gbps and all the downlink ports have a capacity of 25 Gbps. In the future, the capacity of the uplink ports will reach 200 or 400 Gbps, while the capacity of the downlink ports will reach 50 Gbps or 100 Gbps.

The leaf and spine switches generally consist of equipment with a high density of communication ports, which can reach a few dozens of ports. Some of the ports may be electrical ports, while others are fiber optic ports. As mentioned previously, the ports of a switch may have varying networking capabilities in terms of supported bandwidth. Switches with different networking capabilities and functionalities are generally used for implementing the leaf switches and the spine switches. The ports are not limited to communication ports, but also include enclosures for connecting various types of pluggable media.

By contrast, the servers 300 and controllers 400 are computing devices similar to traditional computers, with a limited number of communication ports. For example, each server 300 and each controller 400 comprises two communication ports, respectively connected to two different leaf switches 200. The two communication ports generally consist of Ethernet ports, with a capacity of for example 10 Gbps. However, the servers 300 and/or controllers 400 may include additional port(s).

All the aforementioned communication ports are bidirectional, allowing transmission and reception of data.

Figure 4A:
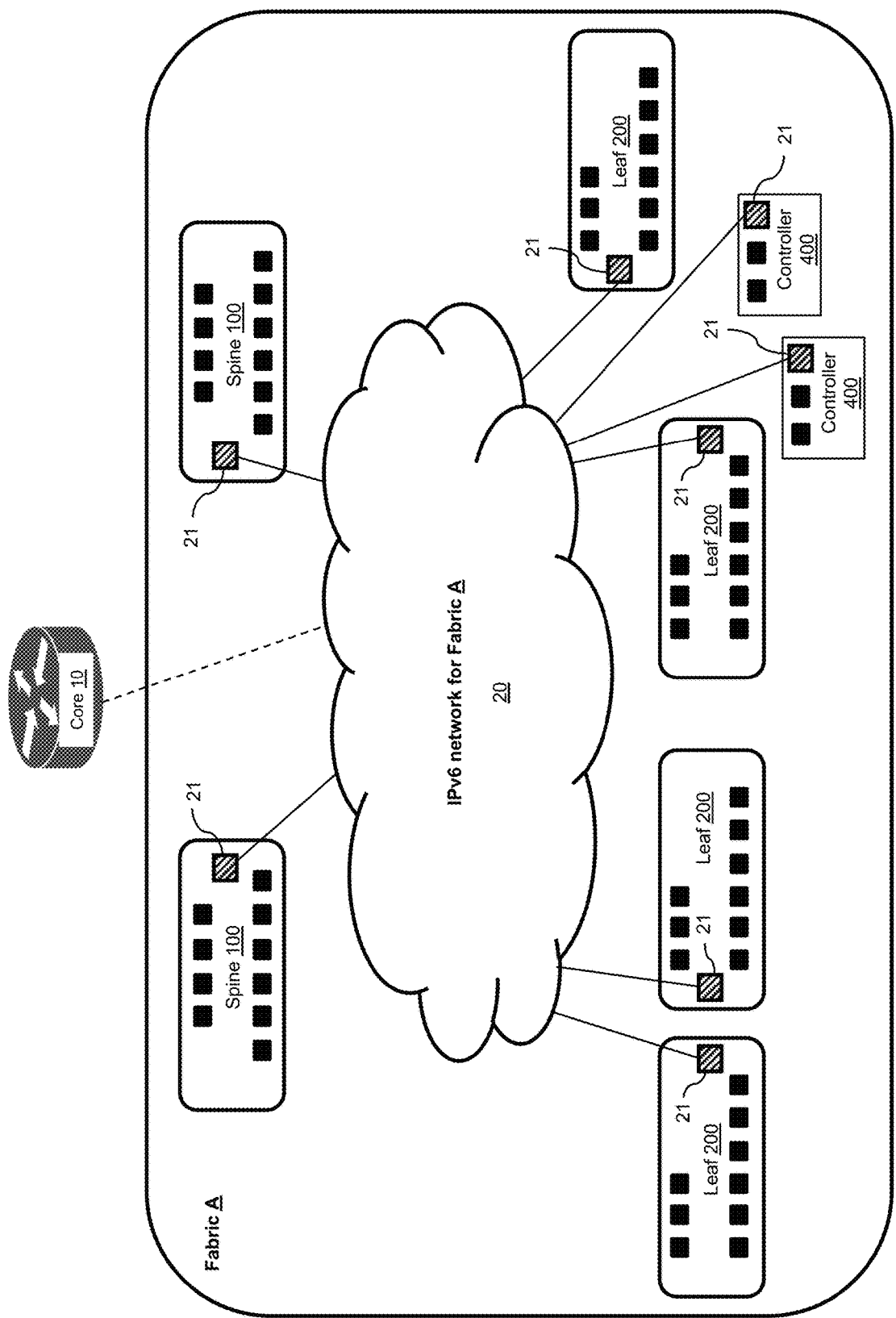
FIGS. 4A and 4B represent an IPv6 network for interconnecting equipment of the fabrics represented in FIGS. 1-3.
Figure 4B:
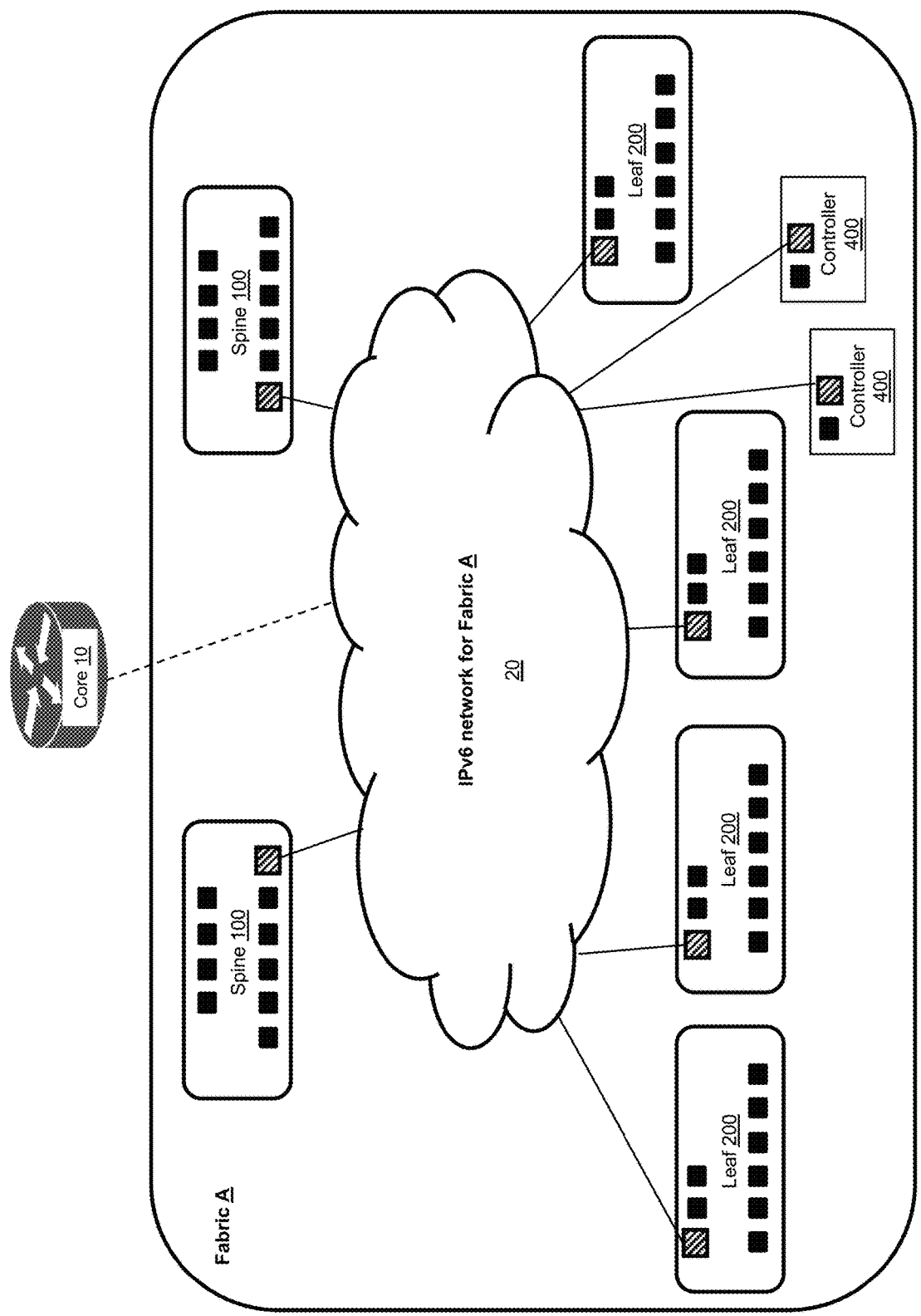

Reference is now made more particularly to FIGS. 4A and 4B, which represent the deployment of an IPv6 network 20 at the fabric level.

At least some of the equipment of the fabric are connected to the IPv6 network 20 and exchange data via this IPv6 network. In the configuration illustrated in FIGS. 4A and 4B, all the spine switches 100, leaf switches 200 and controllers 400 are connected to the IPv6 network 20. Each fabric (e.g. fabrics A, B and C as illustrated in FIG. 1) has its own IPv6 network, with a dedicated IPv6 prefix for each fabric. The generation of the dedicated IPv6 prefix of a given fabric will be illustrated later in the description.

Optionally, additional equipment are connected to the IPv6 network 20. For example, one or more of the core routers 10 are connected to the IPv6 network 20, as illustrated in FIGS. 4A and 4B. Configuration and/or management servers (not represented in FIGS. 4A and 4B for simplification purposes) have access to the IPv6 network 20 through the core router 10.

Optionally, a dedicated switch and/or router (not represented in FIGS. 4A and 4B for simplification purposes) is used for interconnecting the equipment of the fabric A which exchange data via the IPv6 network 20. The aforementioned optional configuration and/or management servers have access to the IPv6 network 20 through the dedicated switch and/or router.

FIG. 4A represents a first illustrative configuration where each equipment of the fabric A (spine switch 100, leaf switch 200 and controller 400) has a dedicated port 21 for accessing the IPv6 network 20. The IPv6 network 20 is a configuration and/or management network isolated from the other IP networks implemented by the fabric A. The dedicated ports 21 of the spine switches 100, leaf switches 200 and controllers 400 are only used to exchange data through the IPv6 network 20. Thus, the IPv6 traffic exchanged via the dedicated ports 21 of the spine switches 100, leaf switches 200 and controllers 400 is isolated from the traffic exchanged via the other ports of the spine switches 100, leaf switches 200 and controllers 400 (illustrated in FIG. 3).

FIG. 4B represents a second illustrative configuration where each equipment of the fabric A (spine switch 100, leaf switch 200 and controller 400) does not use a dedicated port for accessing the IPv6 network 20. On the contrary, a port already used for exchanging other data traffic (illustrated in FIG. 3) is also used for accessing the IPv6 network 20. This configuration has the advantage of not monopolizing a dedicated port at each equipment of the fabric A (spine switch 100, leaf switch 200 and controller 400) solely for accessing the IPv6 network 20.

In an alternative configuration not represented in the Figures, some of the equipment of the fabric A are using a dedicated port for accessing the IPv6 network 20; while other equipment of the fabric A access the IPv6 network 20 through a port also used for exchanging other data traffic.

Furthermore, some of the equipment of the fabric A may use more than one port for accessing the IPv6 network 20.

Figure 5:
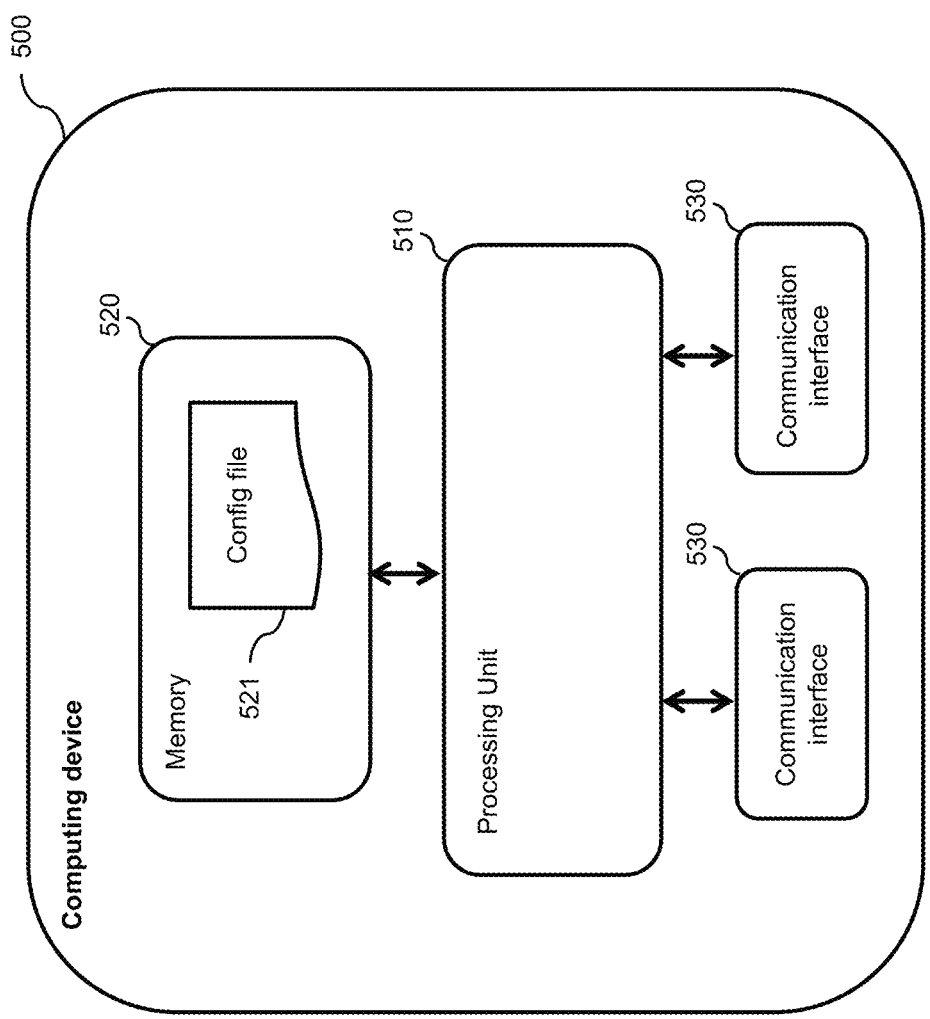
FIG. 5 illustrates a schematic representation of a computing device corresponding to equipment deployed in the fabrics represented in FIGS. 1-3.

Referring now concurrently to FIGS. 4A-B and 5, a computing device 500 is illustrated in FIG. 5. The computing device 500 is a generic functional representation of the devices comprised in the fabric of FIGS. 4A and 4B. Thus, the computing device 500 represents a spine switch 100, a leaf switch 200 or a controller 400.

The computing device 500 comprises a processing unit 510, memory 520, and at least one communication interface 530. The computing device 500 may comprise additional components (not represented in FIG. 5 for simplification purposes). For example, in the case where the computing device 500 represents a controller 400, the computing device may include a user interface and/or a display.

The processing unit 510 comprises one or more processors (not represented in FIG. 5) capable of executing instructions of a computer program. Each processor may further comprise one or several cores. In the case where the computing device 500 represents a switch 100 or 200, the processing unit 510 further includes one or more dedicated processing components (e.g. a network processor, an Application Specific Integrated Circuits (ASIC), etc.) for performing specialized networking functions (e.g. packet forwarding).

The memory 520 stores instructions of computer program(s) executed by the processing unit 510, data generated by the execution of the computer program(s) by the processing unit 510, data received via the communication interface(s) 530, etc. Only a single memory 520 is represented in FIG. 5, but the computing device 500 may comprise several types of memories, including volatile memory (such as Random Access Memory (RAM)) and non-volatile memory (such as a hard drive, Erasable Programmable Read-Only Memory (EPROM), Electrically-Erasable Programmable Read-Only Memory (EEPROM), etc.).

Each communication interface 530 allows the computing device 500 to exchange data with other devices. At least some of the communication interfaces 530 (only two are represented in FIG. 5 for simplification purposes) correspond to the ports of the spine switches 100, leaf switches 200, and controller 400 represented in FIGS. 4A and 4B. Examples of communication interfaces 530 include standard (electrical) Ethernet ports, fiber optic ports, ports adapted for receiving Small Form-factor Pluggable (SFP) units, etc. The communication interfaces 530 are generally of the wireline type; but may also include some wireless ones (e.g. a Wi-Fi interface). The communication interface 530 comprises a combination of hardware and software executed by the hardware, for implementing the communication functionalities of the communication interface 530. Alternatively, the combination of hardware and software for implementing the communication functionalities of the communication interface 530 is at least partially included in the processing unit 510.

Fabric-Wide IPv6 Address

Figure 6:
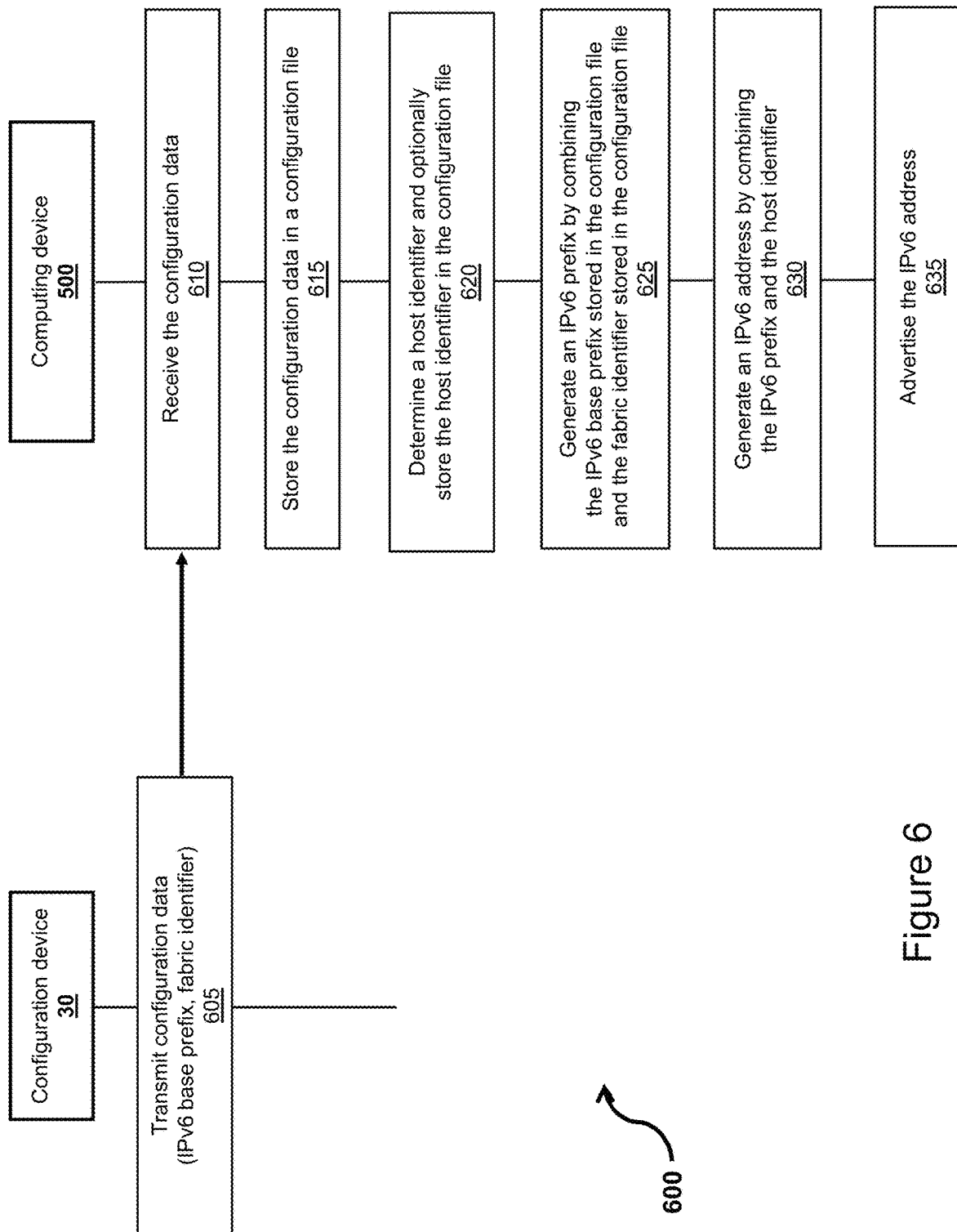
FIG. 6 represents a method for generating a fabric-wide IPv6 address.

Referring now concurrently to FIGS. 4A-B, 5 and 6, a method 600 for generating a fabric-wide IPv6 address is illustrated in FIG. 6. At least some of the steps of the method 600 are performed by the computing device 500 represented in FIG. 5.

A dedicated computer program has instructions for implementing at least some of the steps of the method 600. The instructions are comprised in a non-transitory computer program product (e.g. the memory 520) of the computing device 500. The instructions, when executed by the processing unit 510 of the computing device 500, provide for generating a fabric-wide IPv6 address. The instructions are deliverable to the computing device 500 via an electronically-readable media such as a storage media (e.g. CD-ROM, USB key, etc.), or via communication links (e.g. via a communication network through one of the communication interfaces 530).

The method 600 comprises the step 605 of transmitting configuration data by a configuration device 30 to the computing device 500.

The method 600 comprises the step 610 of receiving the configuration data by the computing device 500. The configuration data are received via one of the communication interfaces 530 of the computing device 500.

The method 600 comprises the step 615 of storing the configuration data in a configuration file 521. The configuration file 521 is stored in the memory 520 of the computing device 500. The configuration data comprise an IPv6 base prefix and a fabric identifier, which will be further detailed in the following steps of the method 600.

The details of the generation and transmission of the configuration data by the configuration device 30 are out of the scope of the present disclosure. A single configuration device 30 is used at the data center level for transmitting the configuration data to the computing devices 500 in each of the fabrics. Alternatively, a dedicated configuration device 30 is used for each of the fabrics of the data center. A person skilled in the art designing data center architectures would readily identify adequate networking protocols and configuration mechanisms for distributing the configuration data from a centralized configuration device 30 to the plurality of computing devices 500 of the fabrics.

Steps 605 and 610 are performed at the initiative of the configuration device 30 (push of the configuration data) or at the initiative of the computing device 500 (pull of the configuration data). In the case of a pull, an additional step comprising a request of the configuration data from the computing device 500 to the configuration device 30 is not represented in FIG. 6 for simplification purposes.

Steps 605 and 610 may occur when the computing device 500 is initially deployed in the fabric. In this case, the computing device 500 is not connected at all (or only partially connected) to any networking infrastructure of the data center. Thus, the configuration data are directly transmitted from the configuration device 30 to the computing device 500 using a basic bootstrap protocol. For instance, a communication interface of the configuration device 30 is physically connected (e.g. via an Ethernet cable) to a communication interface of the computing device 500, and the bootstrap protocol operates on this temporary physical connection for performing the transfer of the configuration data.

The method 600 comprises the step 620 of determining a host identifier and optionally storing the host identifier in the configuration file 521. Step 620 is executed by the processing unit 510 of the computing device 500.

The storage of the host identifier in the configuration file 521 is optional. Alternatively, the host identifier is simply used at other steps of the method 600, without requiring storage of the host identifier in a configuration file. However, it may be more efficient to determine the host identifier only once (for instance if the determination implies calculations), and store it in the configuration file 521, so that it can be used whenever needed without the need to calculate it again.

Thus, the determination of the host identifier comprises one of the following: selecting the host identifier, calculating the host identifier and reading the host identifier from the configuration file 521.

In a first implementation, the host identifier is a selected 48 bits integer in hexadecimal format. For example, the host identifier is a Media Access Control (MAC) address. If at least one of the communication interfaces 530 of the computing device 500 has a MAC address, then the processing unit 510 selects the MAC address of one of the communication interfaces 530 as the host identifier. Since the IPv6 address generated by the method 600 is not associated to a specific communication interface 530 among all the communication interfaces 530 of the computing device 500, any one of the MAC addresses allocated to the computing device 500 can be selected for being the host identifier. For instance, the selected MAC address is the MAC address of the communication interface 530 used for receiving the configuration data at step 610. Equipment such as the switches (spine 100 and/or leaf 200) generally have a dedicated management interface, which is used for performing step 610. The MAC address of the management interface is used for the host identifier.

In a second implementation, the host identifier is determined by calculating a hash of a 128 bits Universal Unique Identifier (UUID) of the computing device 500. For example, the hash of the 128 bits UUID is also a 48 bits integer in hexadecimal format. UUIDs are well known in the art. A UUID is calculated for a given computing device based on various methods (e.g. randomly, using a combination of a MAC address and a timestamp, etc.). The chances of the UUID of a given computing device being identical to the UUID of another device are very low.

The timing for performing step 620 may vary. For example, step 620 is performed before step 610 or after step 625.

The host identifier is not necessarily based on either a MAC address or an UUID. Alternatively, it is calculated based on other seed data, as long as it is unique (or at least has a very high probability of being unique).

The method 600 comprises the step 625 of generating an IPv6 prefix by combining the IPv6 base prefix stored in the configuration file 521 and the fabric identifier stored in the configuration file 521. As mentioned previously, the IPv6 base prefix and the fabric identifier are comprised in the configuration data received at step 610.

An IPv6 address is composed of 128 bits, with the first n bits consisting of the subnet prefix. It is common practice in IPv6 networking to reserve the 64 first bits of the IPv6 address for the subnet prefix (/64 prefix).

The IPv6 prefix generated at step 625 has a length of N bits (generally 64). The IPv6 base prefix stored in the configuration file 521 is an IPv6 prefix with a length of B bits (e.g. 48) lower than N. The fabric identifier stored in the configuration file 521 has a length of I bits. For example, the fabric identifier is a 16 bits integer. Each fabric (e.g. fabric A, fabric B and fabric C in FIG. 1) in the data center has a unique fabric identifier, different from the fabric identifiers of the other fabrics in the data center.

The following relationship applies: B+I<=N.

In an exemplary implementation, the IPv6 prefix is generated as follows: the fabric identifier is directly appended to the IPv6 base prefix. For instance, the IPv6 base prefix is FD10:0:0/48, the fabric identifier is a 16 bits integer <fabric_id>, and the generated IPv6 prefix is FD10:0:0:<fabric_id>:/64.

In another exemplary implementation, the IPv6 prefix is generated as follows. The IPv6 prefix begins with the IPv6 base prefix followed by zeros and terminates with the fabric identifier. For instance, the IPv6 base prefix is FD10::/16, the fabric identifier is a 16 bits integer <fabric_id>, and the generated IPv6 prefix is FD10:0:0:<fabric_id>:/64. In this case, the optional zeros consist of bits 17 to 48 of the IPv6 prefix.

In still another exemplary implementation, the IPv6 prefix is generated as follows. The IPv6 prefix begins with the IPv6 base prefix followed by the fabric identifier and terminates with zeros. For instance, the IPv6 base prefix is FD10::/16, the fabric identifier is a 16 bits integer <fabric_id>, and the generated IPv6 prefix is FD10:<fabric_id>:0:0:/64. In this case, the optional zeros consist of bits 33 to 64 of the IPv6 prefix.

A person skilled in the art of designing data center architectures would readily understand that other combinations of the IPv6 base prefix and fabric identifier may be used for generating the IPv6 prefix.

In an exemplary implementation of the method 600, the generated IPv6 prefix is a unique local address (ULA) IPv6 prefix or a public IPv6 prefix.

The method 600 comprises the step 630 of generating an IPv6 address by combining the IPv6 prefix (generated at step 625) and the host identifier (determined at step 620). This operation is well known in the art of IPv6 networking. For example, if the IPv6 prefix is a traditional/64 prefix, then the last 64 bits of the IPv6 address are generated with the host identifier. If the host identifier has less than 64 bits, zeros are appended before (or after) the host identifier to reach 64 bits.

For example, the IPv6 base prefix is a 48 bits prefix <base_prefix> (e.g. FD10:0:0/48), the fabric identifier is a 16 bits integer <fabric_id>, and the host identifier is a 48 bits integer <host_id>. The generated IPv6 address is: <base_prefix>:<fabric_id>:0:<host_id>.

The method 600 comprises the step 635 of advertising the IPv6 address generated at step 630. This operation is also well known in the art of IPv6 networking and relies on various layer 2 and/or layer 3 communication protocols. The advertising is made on one or more of the communication interfaces 530 of the computing device 500. For example, in the case of a spine switch 100, the IPv6 address is advertised on all the communication ports of the spine switch 100, only on a dedicated management port of the spine switch 100, only on the ports of the spine switch 100 connected to a leaf switch 200, etc. Similarly, in the case of a leaf switch 200, the IPv6 address is advertised on all the communication ports of the leaf switch 200, only on a dedicated management port of the leaf switch 200, only on the ports of the leaf switch 200 connected to a spine switch 100 or a controller 400, etc.

Once step 630 is completed, the computing device 500 is capable of transmitting data over the IPv6 network 20 to other computing devices. The IPv6 address generated at step 630 is used as the source IPv6 address of the IPv6 packets transmitted to the other computing devices. For example, a controller 400 transmits data to a leaf switch 200 or a spine switch 100 over the IPv6 network 20.

Once step 635 is completed, the computing device 500 is capable of receiving data over the IPv6 network 20 from other computing devices which have received the advertised IPv6 address. The IPv6 address advertised at step 635 is used as the destination IPv6 address of the IPv6 packets received from the other computing devices. For example, a controller 400 receives data from a leaf switch 200 or a spine switch 100 over the IPv6 network 20.

Steps 625, 630 and 635 of the method 600 may be repeated several times, based on the information stored in the configuration file 521. By contrast, steps 605 to 620 only need to be performed once, for generating and storing the data required by steps 625 and 630. For instance, steps 625, 630 and 635 are repeated at each boot of the computing device 500; and steps 605 to 620 are only performed at the first boot of the computing device 500 (as long as computing device 500 remains located in the same fabric).

Furthermore, the configuration file may comprise several IPv6 base prefixes. Steps 625, 630 and 635 of the method 600 are repeated for configuring (at step 630) several IPv6 addresses respectively based on one among the several IPv6 base prefixes. This enables the computing device 500 to be part of several IPv6 networks.

Link IPv6 Address

Figure 7A:
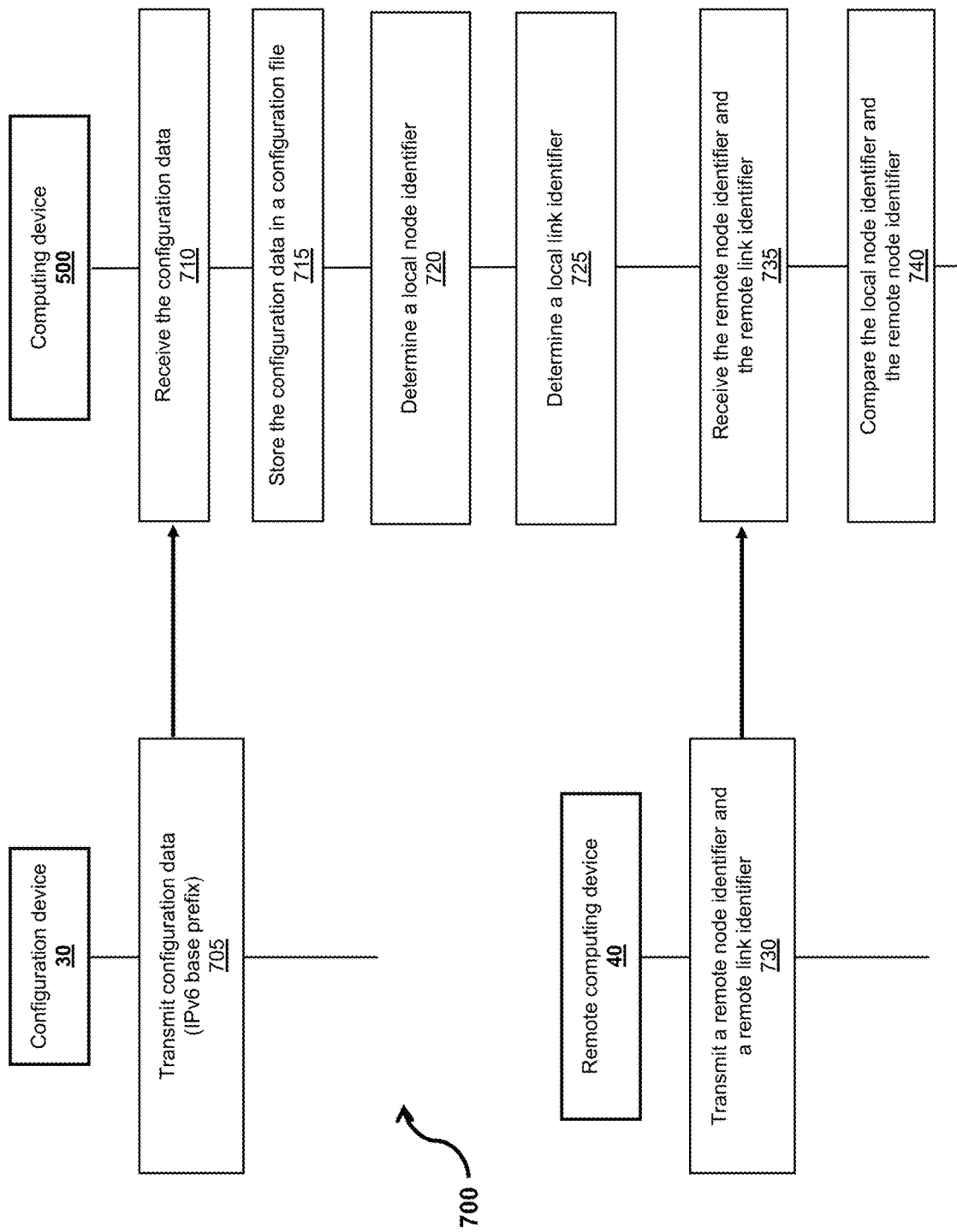
FIGS. 7A and 7B represent a method for generating a link IPv6 address.
Figure 7B:
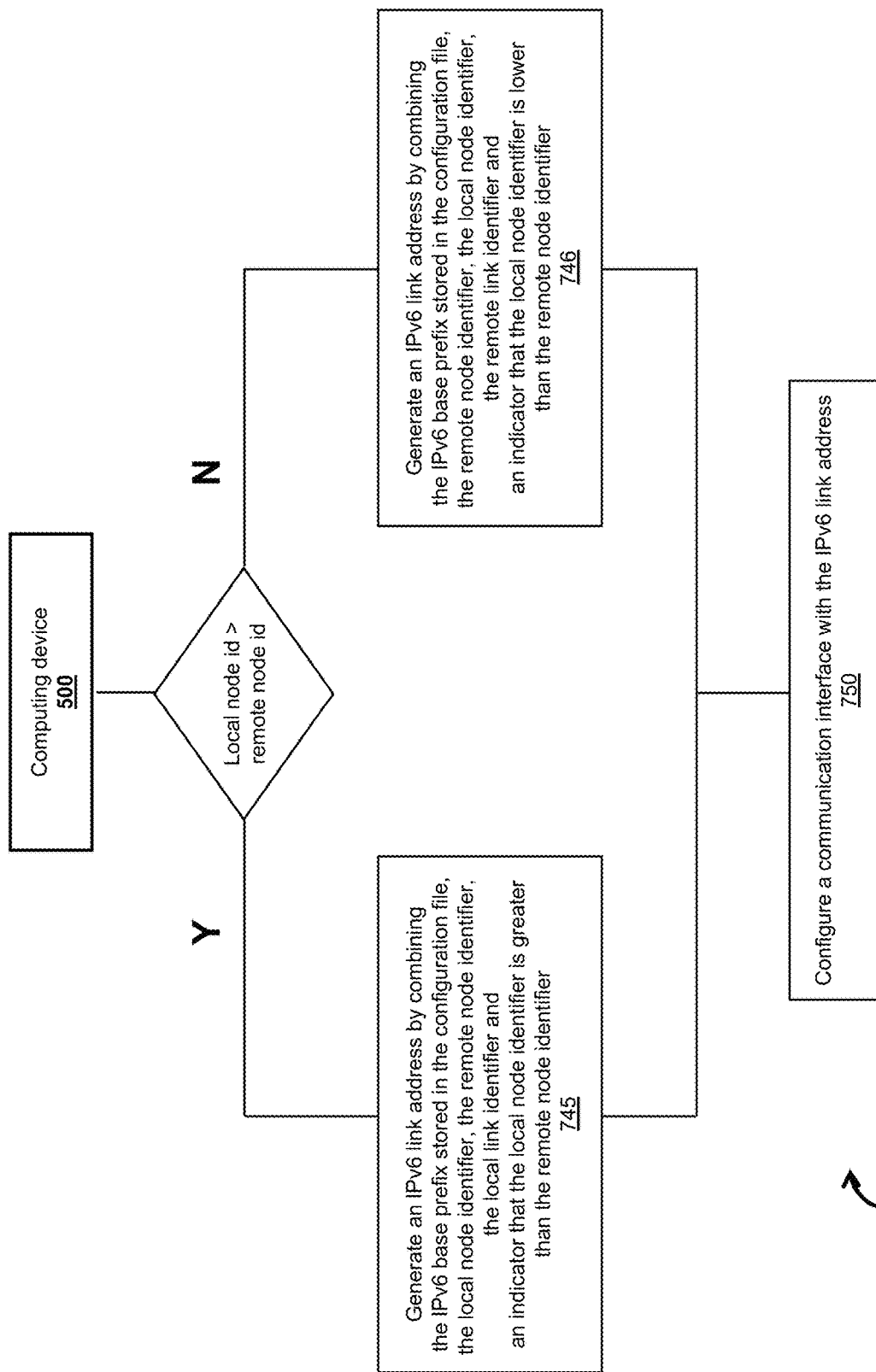

Referring now concurrently to FIGS. 3, 5, 7A and 7B, a method 700 for generating a link IPv6 address for one of the communication interfaces 530 of the computing device 500 is illustrated in FIGS. 7A and 7B. At least some of the steps of the method 700 are performed by the computing device 500 represented in FIG. 5.

A dedicated computer program has instructions for implementing at least some of the steps of the method 700. The instructions are comprised in a non-transitory computer program product (e.g. the memory 520) of the computing device 500. The instructions, when executed by the processing unit 510 of the computing device 500, provide for generating a link IPv6 address. The instructions are deliverable to the computing device 500 via an electronically-readable media such as a storage media (e.g. CD-ROM, USB key, etc.), or via communication links (e.g. via a communication network through one of the communication interfaces 530).

The communication interface 530 of the computing device 500 being configured with the link IPv6 address by the method 700 is connected to a communication interface of a remote computing device 40. The connection (e.g. physical connection via an Ethernet cable) establishes a communication link between the computing device 500 and the remote computing device 40.

The method 700 is based on node identifiers and link identifiers. The node identifier and the link identifier associated to the communication interface 530 of the computing device 500 will be referred to as the local node identifier and the local link identifier. The node identifier and the link identifier associated to the communication interface of the remote computing device 40 will be referred to as the remote node identifier and the remote link identifier.

The method 700 comprises the step 705 of transmitting configuration data by a configuration device 30 to the computing device 500.

The method 700 comprises the step 710 of receiving the configuration data by the computing device 500. The configuration data are received via one of the communication interfaces 530 of the computing device 500.

The method 700 comprises the step 715 of storing the configuration data in the configuration file 521. The configuration data comprise an IPv6 base prefix, which will be further detailed in the following steps of the method 700. For example, the IPv6 base prefix is a /16 prefix.

Steps 705, 710 and 715 are similar to steps 605, 610 and 615 of the method 600 represented in FIG. 6. As mentioned previously with respect to the method 600 represented in FIG. 6, the details of the generation and transmission of the configuration data by the configuration device 30 are out of the scope of the present disclosure.

The method 700 comprises the step 720 of determining a local node identifier for the communication interface 530 of the computing device 500. Optionally, step 720 also comprises storing the local node identifier in the configuration file 521. Step 720 is executed by the processing unit 510 of the computing device 500.

The storage of the local node identifier in the configuration file 521 is optional. Alternatively, the local node identifier is simply used at other steps of the method 700, without requiring storage of the local node identifier in a configuration file. However, it may be more efficient to determine the local node identifier only once (for instance if the determination implies calculations), and store it in the configuration file 521, so that it is used whenever needed without the need to calculate it again.

Thus, the determination of the local node identifier comprises one of the following: selecting the local node identifier, calculating the local node identifier and reading the local node identifier from the configuration file 521.

The same local node identifier is used when performing the method 700 for generating a link IPv6 address for any of the communication interfaces 530 of the computing device 500. Alternatively, different local node identifiers are determined at step 720, each one of the different local node identifiers being associated to one or more communication interfaces 530 among the plurality of communication interfaces 530 of the computing device 500.

In a first implementation, the local node identifier is a selected 48 bits integer in hexadecimal format. For example, the local node identifier is a Media Access Control (MAC) address. If the communication interfaces 530 of the computing device 500 being currently configured with the method 700 has a MAC address, then the processing unit 510 selects the MAC address of this communication interfaces 530 as the local node identifier. If the communication interfaces 530 of the computing device 500 being currently configured with the method 700 does not have its own MAC address, then the MAC address of another communication interface 530 is selected for the local node identifier. For example, equipment such as the switches (spine 100 and/or leaf 200) generally have a dedicated management interface with a MAC address which can be used for the local node identifier.

In a second implementation, the local node identifier is determined by calculating a hash of a 128 bits Universal Unique Identifier (UUID) of the computing device 500. For example, the hash of the 128 bits UUID is also a 48 bits integer in hexadecimal format. UUIDs are well known in the art. A UUID is calculated for a given computing device based on various methods (e.g. randomly, using a combination of a MAC address and a timestamp, etc.). The chances of the UUID of a given computing device being identical to the UUID of another device are very low.

The timing for performing step 720 may vary. Step 720 only needs to be performed before step 740

The local node identifier is not necessarily based on either a MAC address or an UUID. Alternatively, it is calculated based on other seed data, as long as it is unique (or at least has a very high probability of being unique).

The method 700 comprises the step 725 of determining a local link identifier for the communication interface 530 of the computing device 500. The local link identifier is associated to the communication interface 530 for which the link IPv6 address is generated by the method 700. Optionally, step 725 also comprises storing the local link identifier in the configuration file 521. Step 725 is executed by the processing unit 510 of the computing device 500.

The storage of the local link identifier in the configuration file 521 is optional. Alternatively, the local link identifier is simply used at other steps of the method 700, without requiring storage of the local link identifier in a configuration file. However, it may be more efficient to determine the local link identifier only once (for instance if the determination implies calculations), and store it in the configuration file 521, so that it can be used whenever needed without the need to calculate it again.

Thus, the determination of the local link identifier comprises one of the following: selecting the local link identifier, calculating the local link identifier and reading the local link identifier from the configuration file 521.

Each one of the communication interfaces 530 of the computing device 500 has its own local link identifier, which is different from the local link identifiers of the other communication interfaces 530.

For example, the local link identifier is a 15 bits integer in hexadecimal format. In the case of a spine switch 100 or a leaf switch 200, each port of the switch is allocated a unique integer in the range 1 to N, where N is the number of ports of the switch. The unique integer allocated to a given port is used for the local link identifier.

The determination of the local link identifier is not limited to the allocation of a unique integer in a given range of integers (e.g. 1 to N). Other techniques or algorithms can be used for determining unique local link identifiers respectively associated to the communication interfaces 530 of the computing device 500.

The method 700 comprises the step 730 of transmitting the remote node identifier and the remote link identifier by the remote computing device 40 to the computing device 500.

The method 700 comprises the step 735 of receiving the remote node identifier and the remote link identifier by the computing device 500. The remote node identifier and the remote link identifier are received via the communication interfaces 530 of the computing device 500 being currently configured with the link IPv6 address by the method 700.

For example, the remote node identifier and the remote link identifier are transmitted from the remote computing device 40 to the computing device 500 through the Link Layer Discovery Protocol (LLDP). However, other protocols than LLDP may be used for this purpose.

Optionally, the remote node identifier and the remote link identifier are also stored in the configuration file 521.

The remote node identifier and the local node identifier have the same size in bits. For example, if the local node identifier is a 48 bits integer in hexadecimal format, then the remote node identifier is also a 48 bits integer in hexadecimal format. Similarly, the remote link identifier and the local link identifier have the same size in bits. For example, if the local link identifier is a 15 bits integer in hexadecimal format, then the remote link identifier is also a 15 bits integer in hexadecimal format.

The method 700 comprises the step 740 of comparing the local node identifier and the remote node identifier. For example, the local and remote node identifiers are interpreted as integers, which are compared for determining which one of the two is greater than the other one.

If the local node identifier is greater than the remote node identifier, the method 700 performs step 745 of generating the link IPv6 address by combining the IPv6 base prefix stored in the configuration file 521, the local node identifier, the remote node identifier, the local link identifier and an indicator that the local node identifier is greater than the remote node identifier.

If the local node identifier is lower than the remote node identifier, the method 700 performs step 746 of generating the link IPv6 address by combining the IPv6 base prefix stored in the configuration file 521, the remote node identifier, the local node identifier, the remote link identifier and an indicator that the local node identifier is lower than the remote node identifier.

For example, the indicator is a Boolean which takes the value 0 if the local node identifier is greater than the remote node identifier, and the value 1 if the local node identifier is lower than the remote node identifier. Alternatively, the Boolean indicator could take the value 1 if the local node identifier is greater than the remote node identifier, and the value 0 if the local node identifier is lower than the remote node identifier.

The method 700 comprises the step 750 of configuring the communication interface 530 with the link IPv6 address generated at step 745 or 746. The configuration of a communication interface with an IPv6 address is well known in the art of IPv6 networking.

Once step 750 is completed, the computing device 500 is capable of exchanging data with the remote computing device 40 through the communication interface configured with the link IPv6 address at step 750. The link IPv6 address generated at step 745 or 746 is used as the source IPv6 address of the IPv6 packets transmitted to the remote computing device 40. The link IPv6 address generated at step 745 or 746 is used as the destination IPv6 address of the IPv6 packets received from the remote computing device 40. In order to start exchanging data, the remote computing device 40 needs to have also executed the method 700 for configuring a corresponding link IPv6 address on a corresponding communication interface of the remote computing device 40. As will be described later in relation to FIGS. 8A and 8B, the computing device 500 is capable of inferring the corresponding link IPv6 address of the remote computing device 40 based on its own link IPv6 address. Similarly, the remote computing device 40 is capable of inferring the corresponding link IPv6 address of the computing device 500 based on its own link IPv6 address.

The computing device 500 may also exchange data with other computing devices (different from computing device 40) via the communication interface configured at step 750. The link IPv6 address generated at step 745 or 746 is used as the source IPv6 address of outgoing IPv6 packets and as the destination IPv6 address of incoming IPv6 packets.

In an alternative implementation, step 745 is performed if the local node identifier is lower than the remote node identifier; and step 746 is performed if the local node identifier is greater than the remote node identifier. This alternative implementation is not represented in the Figures.

An IPv6 address is composed of 128 bits, with the first n bits generally consisting of the subnet prefix. It is common practice in IPv6 networking to reserve the 64 first bits of the IPv6 address for the subnet prefix (/64 prefix). However, the generation of the link IPv6 address by the method 700 does not follow this common practice.

The IPv6 base prefix stored in the configuration file 521 is an IPv6 prefix <base_prefix> with a length of B bits (e.g. 16 bits). The local and remote node identifiers (respectively <local_node_id> and <remote_node_id>) have a length of N bits (e.g. 48 bits). The local and remote link identifiers (respectively <local_link_id> and <remote_link_id>) have a length of L bits (e.g. 15 bits). The indicator has a length of I bits (e.g. 1 bit).

The following relationship applies: $B+2*N+L+I=128$.

The link IPv6 address generated by the method 700 has the following format:
<base_prefix>:<local_node_id>:<remote_node_id>:<local_link_id>:<indicator> (step 745)
or
<base_prefix>:<remote_node_id>:<local_node_id>:<remote_link_id>:<indicator> (step 746).

For instance, the IPv6 base prefix is FD04::/16. The local and remote node identifiers are 48 bits MAC addresses. The local and remote link identifiers are 15 bits identifiers consisting of the respective port numbers. The indicator is a one bit Boolean. The link IPv6 address generated by the method 700 has one of the following formats:
FD04:<local_MAC_address>:<remote_MAC_address>:<local_port_nb>:0 (step 745)
or
FD04:<remote_MAC_address>:<local_MAC_address>:<remote_port_nb>:1 (step 746).

In an exemplary implementation of the method 700, the generated link IPv6 address is a unique local address (ULA) compliant with Request for Comments (RFC) 4193 of the Internet Engineering Task Force (IETF).

The generation of the IPv6 link address at steps 745 and 746 may combine additional item(s) to those already described at step 745 and 746, as long as the generated IPv6 link address has 128 bits. For example, if shorter local and remote node identifiers are used, the IPv6 link address generate at step 745 may include the remote link identifier (e.g. <base_prefix>: <local_node_id>: <remote_node_id>: <local_link_id>:<remote_link_i d>:<indicator>) and the IPv6 link address generate at step 746 may include the local link identifier (e.g. <base_prefix>:<remote_node_id>:<local_node_id>:<remote_link_id>:<local_link_i d>:<indicator>).

Steps 730, 735, 740, 745 or 746, and 750 of the method 700 may be repeated several times, using the information stored in the configuration file 521. By contrast, steps 705 to 725 only need to be performed once, for generating and storing in the configuration 521 the data required by steps 730 to 750 (IPv6 base prefix, local node identifier and local link identifier). For instance, steps 730 to 750 are repeated at each boot of the computing device 500; and steps 705 to 735 are only performed at the first boot of the computing device 500.

A software-based mechanism can be implemented for triggering the computing device 500 to perform steps 730 to 750 at any time. The software-based mechanism may be implemented via a user interface of the computing device 500, via a control message received by the computing device 500, etc. For example, if the communication interface 530 of the computing device 500 which has been previously configured with the method 700 is physically or functionally connected to a new communication interface of the remote computing device 40 (or to a communication interface of a new remote computing device 40), then the software-based mechanism shall be invoked for triggering the execution of steps 730 to 750.

Figure 8A:
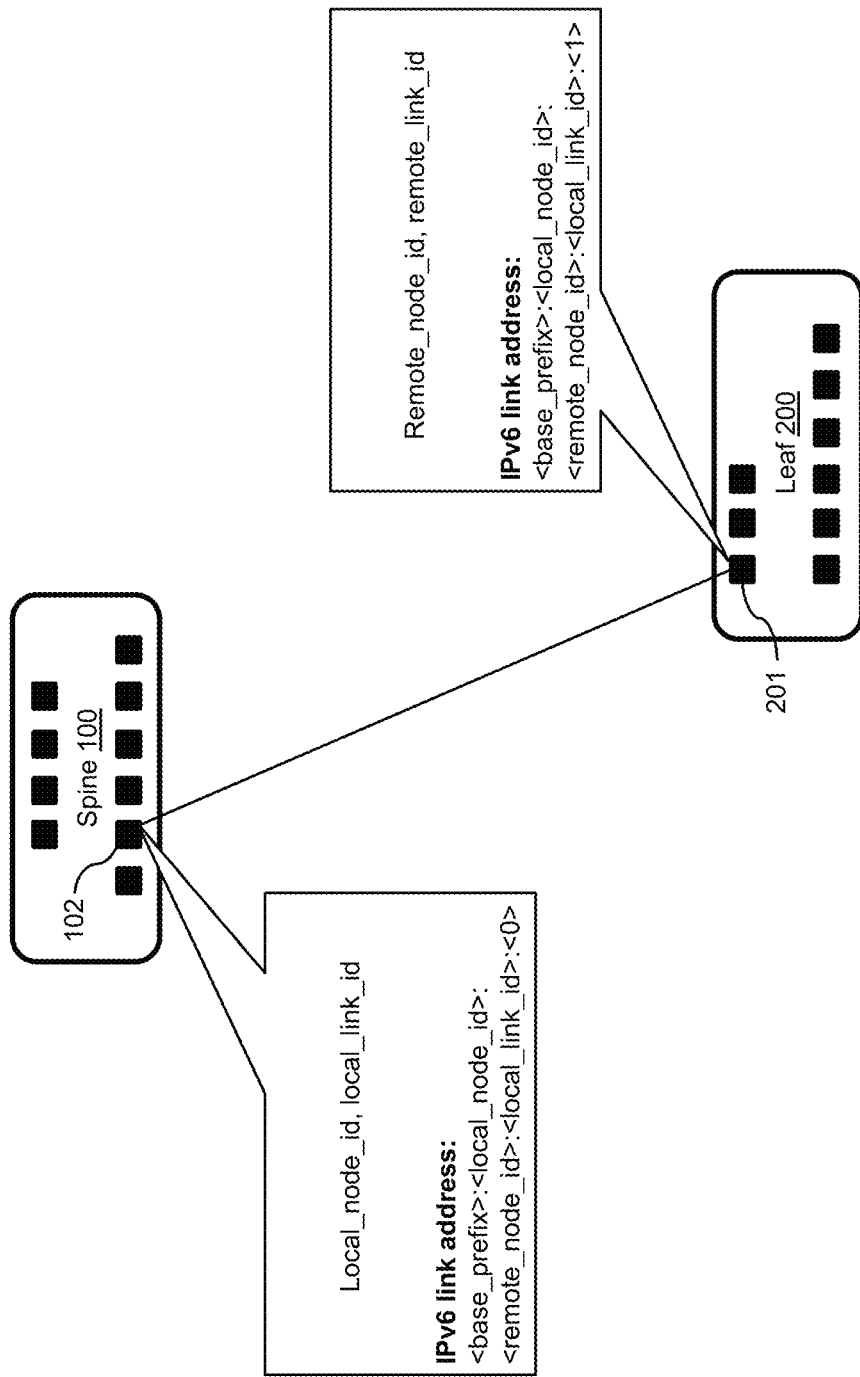
FIGS. 8A and 8B illustrate the method of FIGS. 7A and 7B applied to equipment of the fabric of FIG. 3.
Figure 8B:
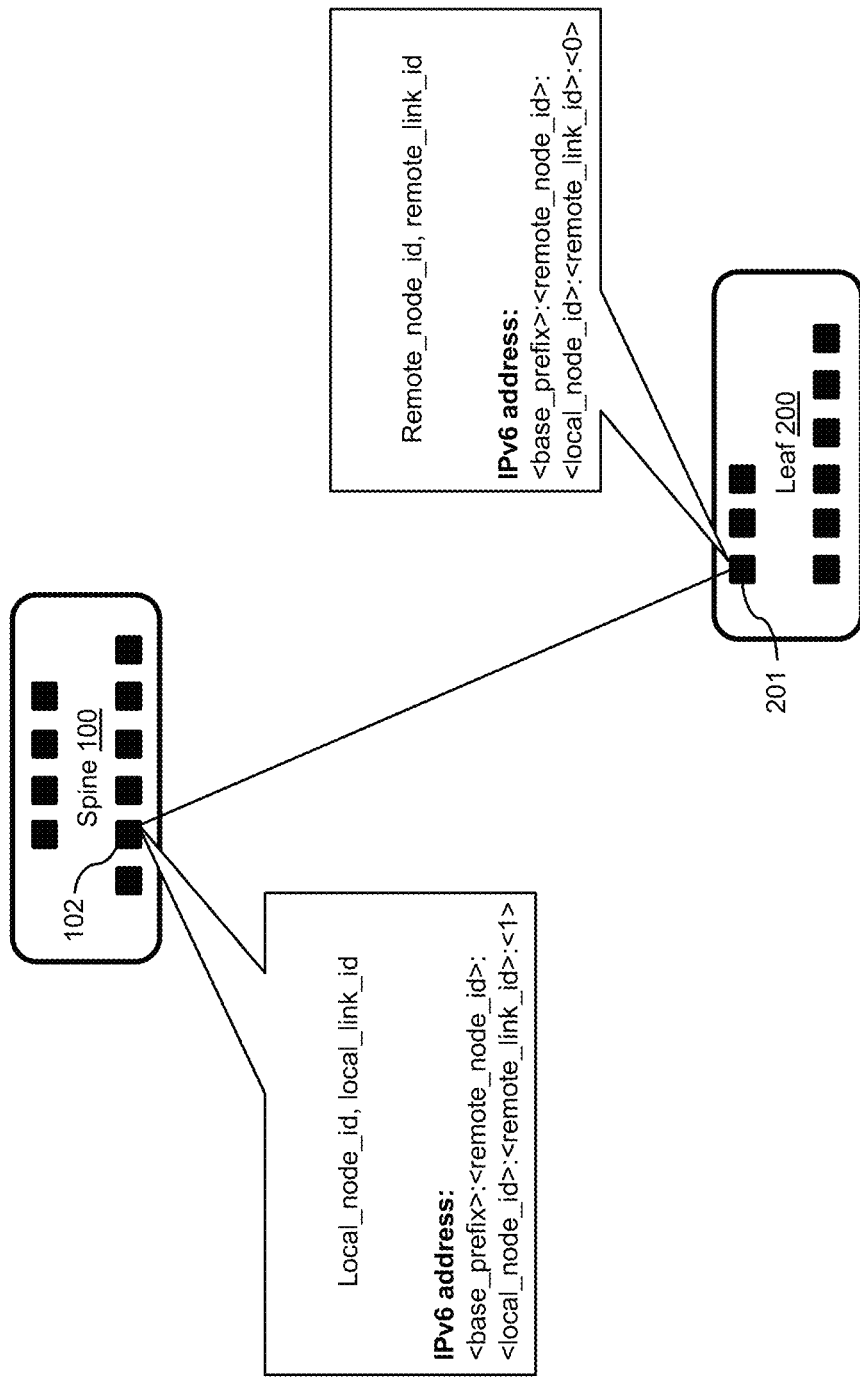

Reference is now made concurrently to FIGS. 7B, 8A and 8B, where FIGS. 8A and 8B illustrate exemplary link IPv6 addresses generated by steps 745 and 746 of the method 700.

The spine switch 100 and leaf switch 200 of FIGS. 8A and 8B respectively correspond to the computing device 500 and remote computing device 40 of FIGS. 7A and 7B. The spine switch 100 includes a port 102 connected (e.g. via an Ethernet cable) to a port 201 of the leaf switch 200. A local node identifier (local_node_id) and a local link identifier (local_link_id) are associated to port 102. Similarly, a remote node identifier (remote_node_id) and a remote link identifier (remote_link_id) are associated to port 201.

As illustrated in FIG. 8A, if the local node identifier is greater than the remote node identifier, the link IPv6 address generated at step 745 for port 102 is as follows:
<base_prefix>:<local_node_id>:<remote_node_id>:<local_link_id>:<0>.

Applying the method 700 to generate a link IPv6 address for port 201, the link IPv6 address generated at step 746 for port 201 is as follows:
<base_prefix>:<local_node_id>:<remote_node_id>:<local_link_id>:<1>.

As illustrated in FIG. 8B, if the local node identifier is lower than the remote node identifier, the link IPv6 address generated at step 746 for port 102 is as follows:
<base_prefix>: <remote_node_id>:<local_node_id>:<remote_link_id>:<1>.

Applying the method 700 to generate a link IPv6 address for port 201, the link IPv6 address generated at step 745 for port 201 is as follows:
<base_prefix>:<remote_node_id>:<local_node_id>:<remote_link_id>:<0>.

It should be noted that after executing the method 700, the spine switch 100 is capable of determining the corresponding link IPv6 address allocated to port 201 of the leaf switch 200 (when leaf switch 200 executes the method 700). More specifically, if the link IPv6 address allocated to port 102 is generated by performing step 745, then the corresponding link IPv6 address allocated to port 201 is determined by performing step 745 with an adapted value for the indicator (e.g. the value of the indicator is changed from 0 to 1 or 1 to 0). Similarly, if the link IPv6 address allocated to port 102 is generated by performing step 746, then the corresponding link IPv6 address allocated to port 201 is determined by performing step 746 with an adapted value for the indicator (e.g. the value of the indicator is changed from 0 to 1 or 1 to 0). The same property applies to the leaf switch 200 executing the method 700 and being capable of determining the corresponding link IPv6 address allocated to port 102 of the spine switch 100.

Reference is now made concurrently to FIGS. 3, 7B, 8A and 8B. FIGS. 8A and 8B are for illustration purposes only; and could be readily adapted to illustrate exemplary link IPv6 addresses generated by steps 745 and 746 of the method 700 in other configurations. The other configurations include the connection of a port of a spine switch 100 with a port of a controller 400, the connection of a port of a leaf switch 100 with a port of a controller 400, the connection of a port of a spine switch 100 with a port of another spine switch 100, and the connection of a port of a leaf switch 100 with a port of another leaf switch 100.

As mentioned previously with reference to FIG. 3, port 102 is not necessarily physically connected to port 201 (e.g. via an Ethernet cable). For example, an intermediate equipment not represented in the Figures (e.g. an intermediate switch) is used for functionally connecting port 102 to port 201. In this configuration, port 102 is directly physically connected to one port of the intermediate (switching) equipment, and port 201 is directly physically connected to another port of the intermediate (switching) equipment. In this case, several link IPv6 addresses may be generated and configured by the method 700 for port 102 of the switch spine 100. Each link IPv6 address corresponds to a functional link to a port of another equipment (having a remote node id and a remote link id). All the functional links are supported by the physical link between port 102 and the intermediate equipment.

The terminology port is used since most of the equipment of the fabric have communication interfaces in the form of ports (e.g. Ethernet electrical port, optical port, etc.). However, FIGS. 8A and 8B can be generalized to any type of communication interface, as long as the communication interface to which steps 745 and 746 of the method 700 is applied has been allocated a local node identifier and a local link identifier.

Figure 9A:
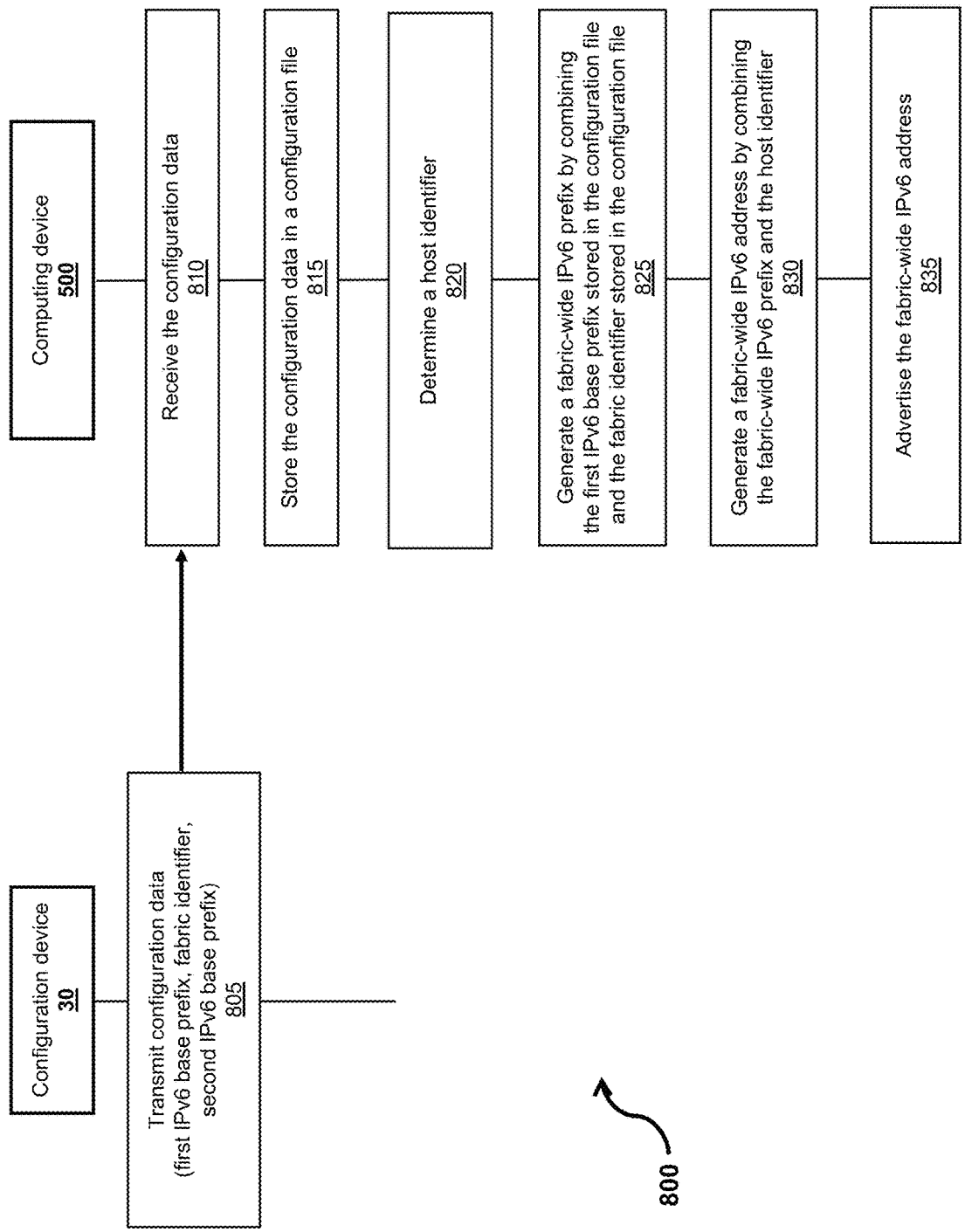
FIGS. 9A, 9B and 9C represent a method for performing a network configuration by combining the methods of FIGS. 6 and 7A-B.
Figure 9B:
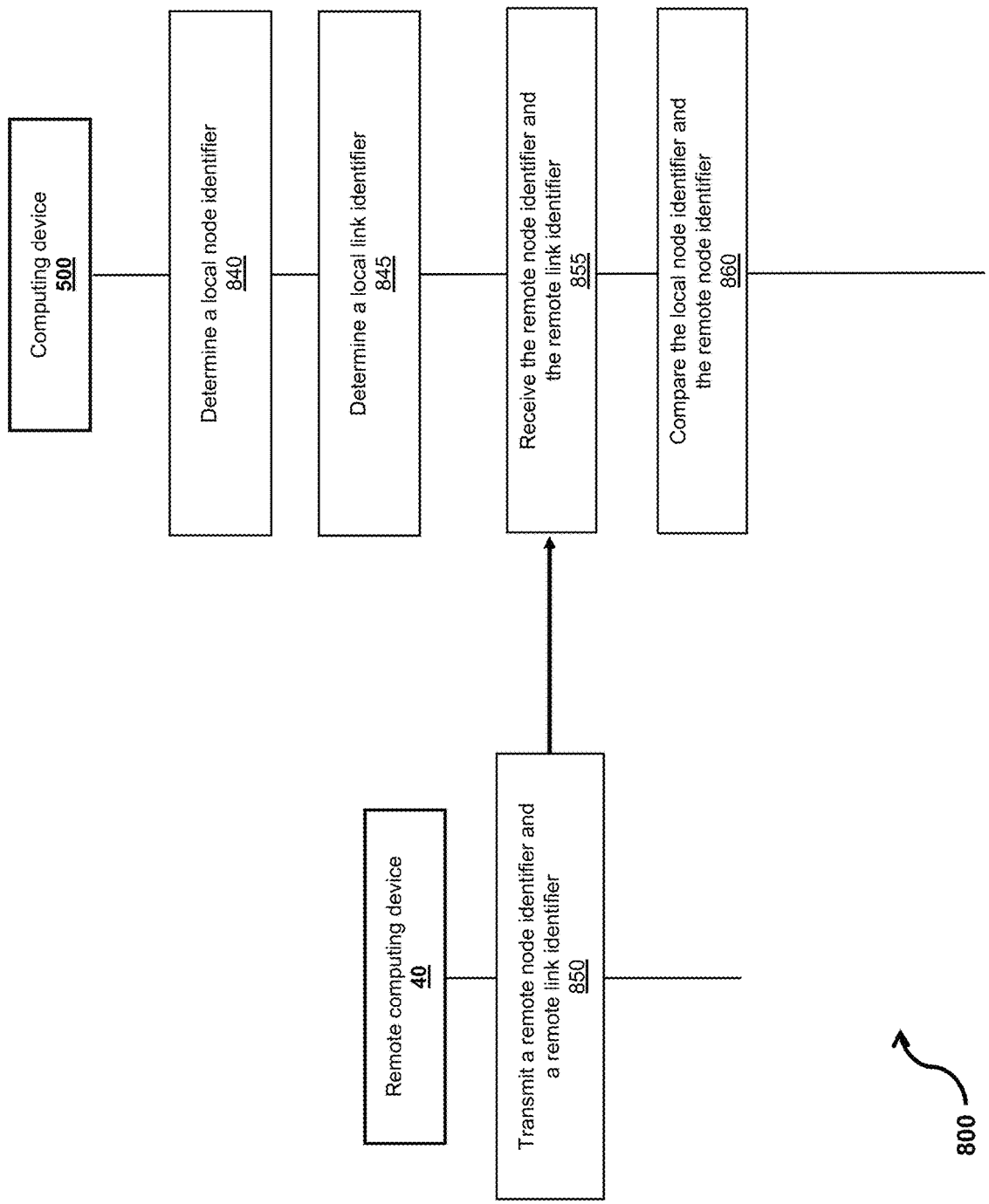
Figure 9C:
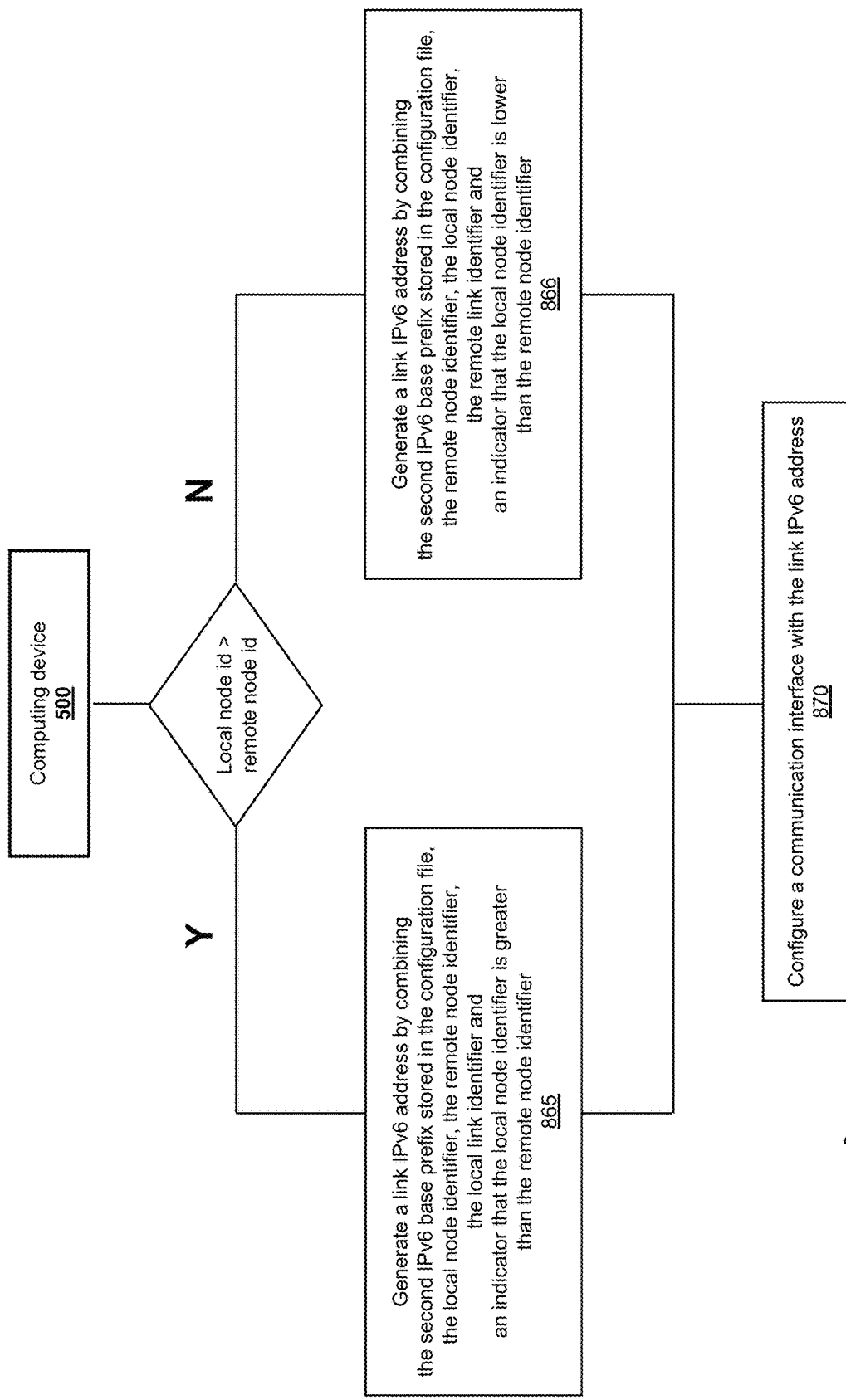

Network Configuration Including the Generation of a Fabric-Wide IPv6 Address and One or More Link IPv6 Address Referring now concurrently to FIGS. 3, 5, 6, 7A, 7B, 9A, 9B and 9C, a method 800 for performing a network configuration of the computing device 500 is illustrated in FIGS. 9A, 9B and 9C. At least some of the steps of the method 800 are performed by the computing device 500 represented in FIG. 5.

The network configuration includes the generation of a fabric-wide IPv6 address described in the method 600 illustrated in FIG. 6. The network configuration further includes the generation of one or more link IPv6 address described in the method 700 illustrated in FIGS. 7A and 7B. Several communication interfaces 530 of the computing device 500 are configured with a link IPv6 address by repeating the steps of the method 700 for each communication interface 530.

A dedicated computer program has instructions for implementing at least some of the steps of the method 800. The instructions are comprised in a non-transitory computer program product (e.g. the memory 520) of the computing device 500. The instructions, when executed by the processing unit 510 of the computing device 500, provide for performing a network configuration of the computing device 500. The instructions are deliverable to the computing device 500 via an electronically-readable media such as a storage media (e.g. CD-ROM, USB key, etc.), or via communication links (e.g. via a communication network through one of the communication interfaces 530).

The method 800 comprises the step 805 of transmitting configuration data by the configuration device 30 to the computing device 500. Step 805 corresponds to step 605 of the method 600 and step 705 of the method 700.

The method 800 comprises the step 810 of receiving the configuration data by the computing device 500. The configuration data are received via one of the communication interfaces 530 of the computing device 500. Step 810 corresponds to step 610 of the method 600 and step 710 of the method 700.

The method 800 comprises the step 815 of storing the configuration data in the configuration file 521. Step 815 corresponds to step 615 of the method 600 and step 715 of the method 700. The configuration data comprise a first IPv6 base prefix, a fabric identifier, and a second IPv6 base prefix.

The method 800 comprises the step 820 of determining a host identifier and optionally storing the host identifier in the configuration file 521. Step 820 corresponds to step 620 of the method 600.

The method 800 comprises the step 825 of generating a fabric-wide IPv6 prefix by combining the first IPv6 base prefix stored in the configuration file 521 and the fabric identifier stored in the configuration file 521. Step 825 corresponds to step 625 of the method 600.

The method 800 comprises the step 830 of generating a fabric-wide IPv6 address by combining the fabric-wide IPv6 prefix (generated at step 825) and the host identifier (determined at step 820). Step 830 corresponds to step 630 of the method 600.

The method 800 comprises the step 835 of advertising the fabric-wide IPv6 address generated at step 830. Step 835 corresponds to step 635 of the method 600.

The method 800 comprises the step 840 of determining a local node identifier for the communication interface 530 of the computing device 500; and optionally storing the local node identifier in the configuration file 521. Step 840 corresponds to step 720 of the method 700.

In a particular implementation of the method 800, the local node identifier consists of the host identifier determined at step 820.

The method 800 comprises the step 845 of determining a local link identifier for the communication interface 530 (corresponding to the local node identifier and local link identifier) of the computing device 500; and optionally storing the local link identifier in the configuration file 521. Step 845 corresponds to step 725 of the method 700.

The method 800 comprises the step 850 of transmitting a remote node identifier and a remote link identifier by the remote computing device 40 to the computing device 500. Step 850 corresponds to step 730 of the method 700.

The method 800 comprises the step 855 of receiving the remote node identifier and the remote link identifier by the computing device 500. Step 855 corresponds to step 735 of the method 700.

The method 800 comprises the step 860 of comparing the local node identifier and the remote node identifier. Step 860 corresponds to step 740 of the method 700.

If the local node identifier is greater than the remote node identifier, the method 800 performs step 865 of generating the link IPv6 address by combining the second IPv6 base prefix stored in the configuration file 521, the local node identifier, the remote node identifier, the local link identifier and an indicator that the local node identifier is greater than the remote node identifier. Step 865 corresponds to step 745 of the method 700.

If the local node identifier is lower than the remote node identifier, the method 800 performs step 866 of generating the link IPv6 address by combining the second IPv6 base prefix stored in the configuration file 521, the remote node identifier, the local node identifier, the remote link identifier and an indicator that the local node identifier is lower than the remote node identifier. Step 866 corresponds to step 746 of the method 700.

In an alternative implementation (already mentioned previously), step 865 is performed if the local node identifier is lower than the remote node identifier; and step 866 is performed if the local node identifier is greater than the remote node identifier. This alternative implementation is not represented in the Figures.

The method 800 comprises the step 870 of configuring the communication interface 530 (corresponding to the local node identifier and local link identifier) with the link IPv6 address generated at step 865 or 866. Step 870 corresponds to step 750 of the method 700.

Several communication interfaces 530 of the computing device 500 can be configured with a link IPv6 address by repeating steps 840 to 870 of the method 800 for each communication interface 530.

All the details and specificities of the respective steps of the methods 600 and 700 (which have been previously addressed when describing the methods 600 and 700) also apply to the corresponding steps of the method 800. Such details and specificities have not been repeated when describing the method 800 for simplification purposes.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A computing device comprising:
a communication interface;
memory for storing a configuration file, the configuration file comprising an Internet Protocol version 6 (IPv6) base prefix; and
a processing unit for:
  determining a local node identifier for the communication interface;
  determining a local link identifier for the communication interface;
  receiving from a remote computing device via the communication interface a remote node identifier and a remote link identifier for a remote communication interface of the remote computing device;
comparing the local node identifier and the remote node identifier;
generating an IPv6 address by:
if the local node identifier is greater than the remote node identifier, combining the IPv6 base prefix stored in the configuration file, the local node identifier, the remote node identifier, the local link identifier and an indicator that the local node identifier is greater than the remote node identifier; and
if the local node identifier is lower than the remote node identifier, combining the IPv6 base prefix stored in the configuration file, the remote node identifier, the local node identifier, the remote link identifier and an indicator that the local node identifier is lower than the remote node identifier; and
configuring the communication interface with the IPv6 address.

2. The computing device of claim 1, wherein the IPv6 address is a Unique Local Address (ULA) compliant with Request for Comments (RFC) 4193 of the Internet Engineering Task Force (IETF).

3. The computing device of claim 1, wherein the IPv6 base prefix is a /16 prefix.

4. The computing device of claim 1, wherein the local node identifier and the remote node identifier are 48 bits integers in hexadecimal format.

5. The computing device of claim 4, wherein the local node identifier is a Media Access Control (MAC) address.

6. The computing device of claim 4, wherein the processing unit determines the local node identifier by calculating a hash of a 128 bits Universal Unique Identifier (UUID) of the computing device.

7. The computing device of claim 1, wherein the local link identifier and the remote link identifier are 15 bits integers in hexadecimal format.

8. The computing device of claim 1, wherein the indicator is a one bit Boolean having the value 0 if the local node identifier is greater than the remote node identifier and the value 1 if the local node identifier is lower than the remote node identifier.

9. The computing device of claim 1, wherein the IPv6 base prefix is received from a configuration device via the communication interface or another communication interface of the computing device, and further stored in the configuration file.

10. The computing device of claim 1, wherein the remote node identifier and the remote link identifier are transmitted from the remote computing device to the computing device via the Link Layer Discovery Protocol (LLDP).

11. A method for generating a link Internet Protocol version 6 (IPv6) address, comprising
storing a configuration file in a memory of a computing device, the configuration file comprising an IPv6 base prefix; and
determining by a processing unit of the computing device a local node identifier for a communication interface of the computing device;
determining by the processing unit a local link identifier for the communication interface of the computing device;
receiving by the processing unit from a remote computing device via the communication interface a remote node identifier and a remote link identifier for a remote communication interface of the remote computing device;
comparing by the processing unit the local node identifier and the remote node identifier;
generating by the processing unit an IPv6 address by:
if the local node identifier is greater than the remote node identifier, combining the IPv6 base prefix stored in the configuration file, the local node identifier, the remote node identifier, the local link identifier and an indicator that the local node identifier is greater than the remote node identifier; and
if the local node identifier is lower than the remote node identifier, combining the IPv6 base prefix stored in the configuration file, the remote node identifier, the local node identifier, the remote link identifier and an indicator that the local node identifier is lower than the remote node identifier; and
configuring the communication interface with the IPv6 address.

12. The method of claim 11, wherein the IPv6 address is a Unique Local Address (ULA) compliant with Request for Comments (RFC) 4193 of the Internet Engineering Task Force (IETF).

13. The method of claim 11, wherein the IPv6 base prefix is a /16 prefix.

14. The method of claim 11, wherein the local node identifier and the remote node identifier are 48 bits integers in hexadecimal format.

15. The method of claim 14, wherein the local node identifier is a Media Access Control (MAC) address.

16. The method of claim 14, wherein the processing unit determines the local node identifier by calculating a hash of a 128 bits Universal Unique Identifier (UUID) of the computing device.

17. The method of claim 11, wherein the local link identifier and the remote link identifier are 15 bits integers in hexadecimal format.

18. The method of claim 11, wherein the indicator is a one bit Boolean having the value 0 if the local node identifier is greater than the remote node identifier and the value 1 if the local node identifier is lower than the remote node identifier.

19. The computing method of claim 11, wherein the IPv6 base prefix is received from a configuration device via the communication interface or another communication interface of the computing device, and further stored in the configuration file.

20. A non-transitory computer program product comprising instructions executable by a processing unit of a computing device, the execution of the instructions by the processing unit providing for generating a link Internet Protocol version 6 (IPv6) address by:
storing a configuration file in a memory of a computing device, the configuration file comprising an IPv6 base prefix; and
determining by a processing unit of the computing device a local node identifier for a communication interface of the computing device;
determining by the processing unit a local link identifier for the communication interface of the computing device;
receiving by the processing unit from a remote computing device via the communication interface a remote node identifier and a remote link identifier for a remote communication interface of the remote computing device;

comparing by the processing unit the local node identifier and the remote node identifier;
generating by the processing unit an IPv6 address by:
   if the local node identifier is greater than the remote node identifier, combining the IPv6 base prefix stored in the configuration file, the local node identifier, the remote node identifier, the local link identifier and an indicator that the local node identifier is greater than the remote node identifier; and
   if the local node identifier is lower than the remote node identifier, combining the IPv6 base prefix stored in the configuration file, the remote node identifier, the local node identifier, the remote link identifier and an indicator that the local node identifier is lower than the remote node identifier; and
configuring the communication interface with the IPv6 address.

21. A method for performing a network configuration of a computing device located in a fabric of a data center, the method comprising
   storing a configuration file in a memory of the computing device, the configuration file comprising a first Internet Protocol version 6 (IPv6) base prefix, a fabric identifier, and a second IPv6 base prefix;
   determining by a processing unit of the computing device a host identifier;
   generating by the processing unit a factory-wide IPv6 prefix by combining the first IPv6 base prefix stored in the configuration file and the fabric identifier stored in the configuration file;
   generating by the processing unit a fabric-wide IPv6 address by combining the fabric-wide IPv6 prefix and the host identifier;
   determining by the processing unit a local node identifier for a communication interface of the computing device;
   determining by the processing unit a local link identifier for the communication interface of the computing device;
   receiving by the processing unit from a remote computing device via the communication interface a remote node identifier and a remote link identifier for a remote communication interface of the remote computing device;
   comparing by the processing unit the local node identifier and the remote node identifier;
   generating by the processing unit a link IPv6 address by:
      if the local node identifier is greater than the remote node identifier, combining the second IPv6 base prefix stored in the configuration file, the local node identifier, the remote node identifier, the local link identifier and an indicator that the local node identifier is greater than the remote node identifier; and
      if the local node identifier is lower than the remote node identifier, combining the second IPv6 base prefix stored in the configuration file, the remote node identifier, the local node identifier, the remote link identifier and an indicator that the local node identifier is lower than the remote node identifier; and
   configuring the communication interface with the link IPv6 address.

22. The method of claim 21, wherein the processing unit further advertises the factory-wide IPv6 address.

23. The method of claim 21, wherein local node identifier consists of the host identifier.

24. A computing device comprising:
a communication interface;
memory for storing a configuration file, the configuration file comprising an Internet Protocol version 6 (IPv6) base prefix; and
a processing unit for:
   determining a local node identifier for the communication interface;
   determining a local link identifier for the communication interface;
   receiving from a remote computing device via the communication interface a remote node identifier and a remote link identifier for a remote communication interface of the remote computing device;
   comparing the local node identifier and the remote node identifier;
   generating an IPv6 address by:
      if the local node identifier is lower than the remote node identifier, combining the IPv6 base prefix stored in the configuration file, the local node identifier, the remote node identifier, the local link identifier and an indicator that the local node identifier is greater than the remote node identifier; and
      if the local node identifier is greater than the remote node identifier, combining the IPv6 base prefix stored in the configuration file, the remote node identifier, the local node identifier, the remote link identifier and an indicator that the local node identifier is lower than the remote node identifier; and
   configuring the communication interface with the IPv6 address.

* * * * *

UNITED STATES PATENT AND TRADEMARK OFFICE
CERTIFICATE OF CORRECTION

PATENT NO. : 10,873,500 B2  
APPLICATION NO. : 16/143568  
DATED : December 22, 2020  
INVENTOR(S) : Andersson et al.

Page 1 of 1

It is certified that error appears in the above-identified patent and that said Letters Patent is hereby corrected as shown below:

In the Claims

Column 24 Line 33 In Claim 24, the expression "if the local node identifier is lower" should be replaced with "if the local node identifier is greater"

Column 24 Line 38 In Claim 24, the expression "if the local node identifier is greater" should be replaced with "if the local node identifier is lower"

Signed and Sealed this  
Twenty-first Day of December, 2021

Drew Hirshfeld  
*Performing the Functions and Duties of the*  
*Under Secretary of Commerce for Intellectual Property and*  
*Director of the United States Patent and Trademark Office*